(12) United States Patent
Oda et al.

(10) Patent No.: US 11,050,484 B2
(45) Date of Patent: Jun. 29, 2021

(54) OPTICAL TRANSMISSION APPARATUS AND ESTIMATION METHOD

(71) Applicant: FUJITSU LIMITED, Kawasaki (JP)

(72) Inventors: Shoichiro Oda, Fuchu (JP); Setsuo Yoshida, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/781,125

(22) Filed: Feb. 4, 2020

(65) Prior Publication Data

US 2020/0259562 A1    Aug. 13, 2020

(30) Foreign Application Priority Data

Feb. 13, 2019    (JP) .............................. JP2019-023473

(51) Int. Cl.
*H04B 10/25* (2013.01)
*H04B 10/071* (2013.01)
*H04B 10/079* (2013.01)
*H04J 14/06* (2006.01)

(52) U.S. Cl.
CPC ....... *H04B 10/071* (2013.01); *H04B 10/0799* (2013.01); *H04B 10/07957* (2013.01); *H04B 10/25* (2013.01); *H04J 14/06* (2013.01)

(58) Field of Classification Search
CPC ............ H04B 10/071; H04B 10/07957; H04B 10/0799; H04B 10/25; H04J 14/06
See application file for complete search history.

(56) References Cited

U.S. PATENT DOCUMENTS

| | | | |
|---|---|---|---|
| 2005/0259241 A1* | 11/2005 | Tanigawa | G01M 11/3181 356/73.1 |
| 2014/0362367 A1* | 12/2014 | Chen | G01M 11/3127 356/73.1 |
| 2016/0123837 A1* | 5/2016 | Chen | G01M 11/3172 356/73.1 |
| 2019/0120663 A1* | 4/2019 | Suzaki | H04B 10/25891 |

FOREIGN PATENT DOCUMENTS

| | | |
|---|---|---|
| JP | 2004-212325 | 7/2004 |
| JP | 2018-048917 | 3/2018 |

OTHER PUBLICATIONS

B. Huttner et al., "Distributed PMD Measurement with a Polarization-OTDR in Optical Fibers," Journal of Lightwave Technology, vol. 17, No. 10, Oct. 1999, pp. 1843-1848.

* cited by examiner

*Primary Examiner* — Dzung D Tran
(74) *Attorney, Agent, or Firm* — Fujitsu Patent Center

(57) ABSTRACT

An optical transmission apparatus, includes, a light source configured to output a plurality of light beams having different wavelengths to an optical fiber, a receiver configured to receive, from the optical fiber, a reflected light beam corresponding to each of the wavelengths of the plurality of light beams, and a signal processing circuit configured to estimate a polarization fluctuation portion based on a polarization state of the received reflected light beam corresponding to each of the plurality of wavelengths.

14 Claims, 24 Drawing Sheets

FIG. 19
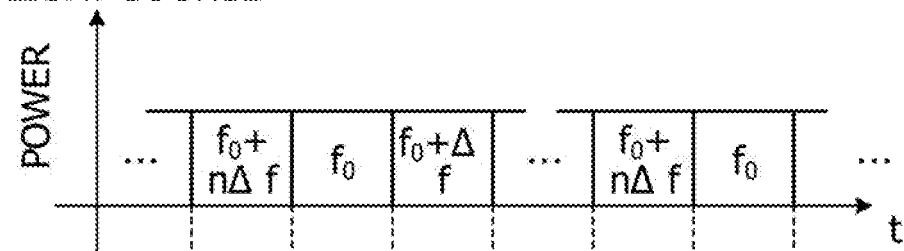
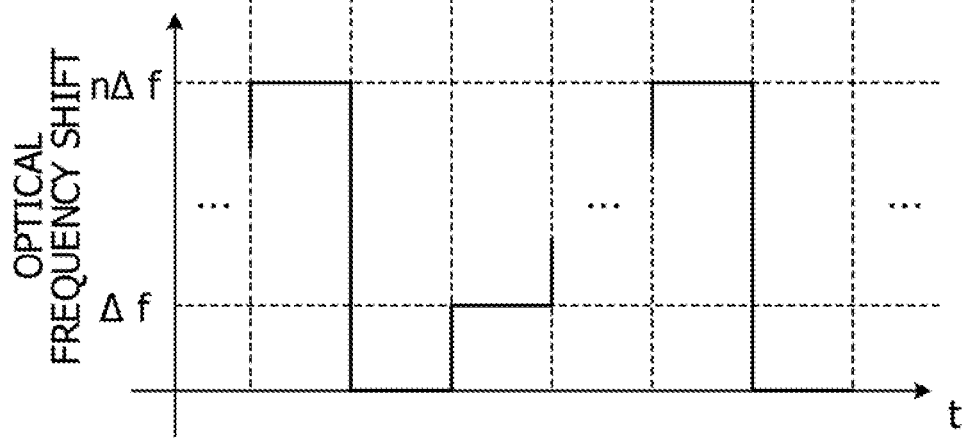

OPTICAL TRANSMISSION APPARATUS AND ESTIMATION METHOD

CROSS-REFERENCE TO RELATED APPLICATION

This application is based upon and claims the benefit of priority of the prior Japanese Patent Application No. 2019-23473, filed on Feb. 13, 2019, the entire contents of which are incorporated herein by reference.

FIELD

The present embodiment relates to an optical mission apparatus and an estimation method.

BACKGROUND

For example, in an optical transmission system using a long-distance optical fiber, a polarization multiplexed optical signal is generally used to improve frequency utilization efficiency. The polarization multiplexed optical signal is polarization-demultiplexed by a polarization demultiplexing circuit in a digital coherent receiver. However, the following fluctuation in a polarization state occurs: polarization rotation occurs at speed equal to or greater than an actual value thereof in a transmission path of an optical fiber. The fluctuation in the polarization state causes a failure in polarization demultiplexing, and an error occurs.

In view of this, in order to operate a highly reliable optical transmission system, it is important to measure fluctuation in the polarization state before and during operation of the system. Therefore, in the optical transmission system, the fluctuation in the polarization state is observed by using optical time domain reflectometers (OTDRs). As a result, by grasping an occurrence portion of the fluctuation in the polarization state on the transmission path of the optical fiber, it is possible to identify cause of the fluctuation in the polarization state and take countermeasures.

For example, Japanese Laid-open Patent Publication No. 2004-212325, Japanese Laid-open Patent Publication No. 2018-48917, and the like are disclosed as related arts.

SUMMARY

According to an aspect of the embodiments, An optical transmission apparatus, includes, a light source configured to output a plurality of light beams having different wavelengths to an optical fiber, a receiver configured to receive, from the optical fiber, a reflected light beam corresponding to each of the wavelengths of the plurality of light beams, and a signal processing circuit configured to estimate a polarization fluctuation portion based on a polarization state of the received reflected light beam corresponding to each of the plurality of wavelengths.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is an explanatory diagram illustrating an example of an output timing of each signal light beam of a wavelength light source of Embodiment 3;

DESCRIPTION OF EMBODIMENTS

In a conventional optical transmission apparatus, an occurrence portion of fluctuation in a polarization state can be grasped, but it is difficult to accurately estimate the occurrence portion of the fluctuation in the polarization state in a transmission path of an optical fiber.

In one aspect, an object is to provide an optical transmission apparatus and the like which can accurately estimate an occurrence portion of fluctuation in a polarization state in an optical fiber.

Hereinafter, embodiments of an optical transmission apparatus, an optical reception apparatus, and an estimation method disclosed in the present application will be described in detail with reference to the drawings. Note that those embodiments do not limit the disclosed technology. Further, each embodiment described below may also be combined as appropriate, without causing inconsistency.

Embodiment 1

Figure 1:
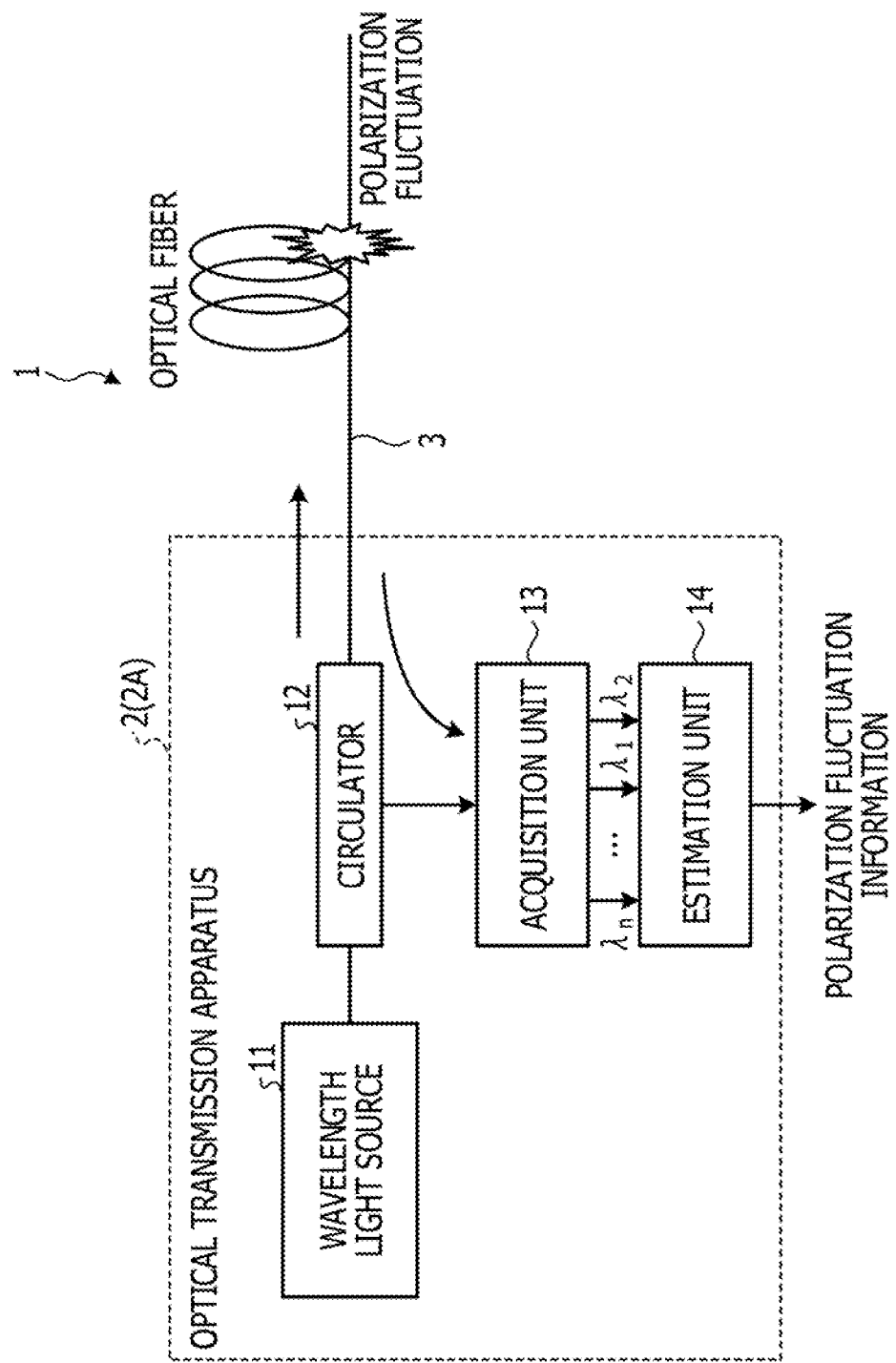
FIG. 1 is an explanatory diagram illustrating an example of an optical transmission system of Embodiment 1.

FIG. 1 is an explanatory diagram illustrating an example of an optical transmission system 1 of Embodiment 1. The optical transmission system 1 illustrated in FIG. 1 includes an optical transmission apparatus 2 (2A) and an optical fiber 3 that is connected to the optical transmission apparatus 2A and transmits signal light to the optical transmission apparatus 2A. The optical transmission apparatus 2A is a transmitter and receiver that transmit and receive signal light. At a certain point in a transmission path in the optical fiber 3, stress, twist, or the like is generated in the optical fiber 3 due to vibration or the like, and a polarization state of light propagated through the optical fiber 3 fluctuates. In an OTDR in the optical transmission apparatus 2A, a polarization fluctuation portion in the transmission path of the optical fiber 3 where fluctuation in a polarization state occurs is estimated by causing signal light to be incident on the optical fiber 3 from an end of the optical fiber 3 and observing the polarization state based on reflected light of the signal light such as Rayleigh scattered light.

The optical transmission apparatus 2A includes a wavelength light source 11, a circulator 12, an acquisition unit 13, and an estimation unit 14. The wavelength light source 11 generates signal light beams having identifiably different wavelengths and sequentially outputs the signal light beams having the different wavelengths to the circulator 12. The circulator 12 sequentially outputs the signal light beams from the wavelength light source 11 to the optical fiber 3 and outputs reflected light beams of the signal light beams including Rayleigh scattered light beams from the optical fiber 3 to the acquisition unit 13.

The acquisition unit 13 receives the reflected light beams of the signal light beams including Rayleigh scattered light beams from the optical fiber 3 via the circulator 12. The acquisition unit 13 acquires a time-dependent polarization state of each signal light beam from the received reflected light beam. Note that, based on the time-dependent polarization state, it is possible to identify fluctuation in the polarization state on a time axis. The estimation unit 14 converts the time-dependent polarization state of each signal light beam acquired by the acquisition unit 13 into a distance-dependent polarization state by which a reflection point in the optical fiber 3 is identifiable. Note that, based on the distance-dependent polarization state, it is possible to identify fluctuation in the polarization state on a distance axis in a longitudinal direction of the optical fiber 3, which is a distance axis in a transmission direction of the signal light beams. Further, the estimation unit 14 estimates a polarization fluctuation portion where polarization fluctuates based on the converted distance-dependent polarization state of each wavelength. Note that the polarization fluctuation portion is a point where fluctuation in the polarization state occurs due to vibration or the like in the optical fiber 3.

Figure 2:
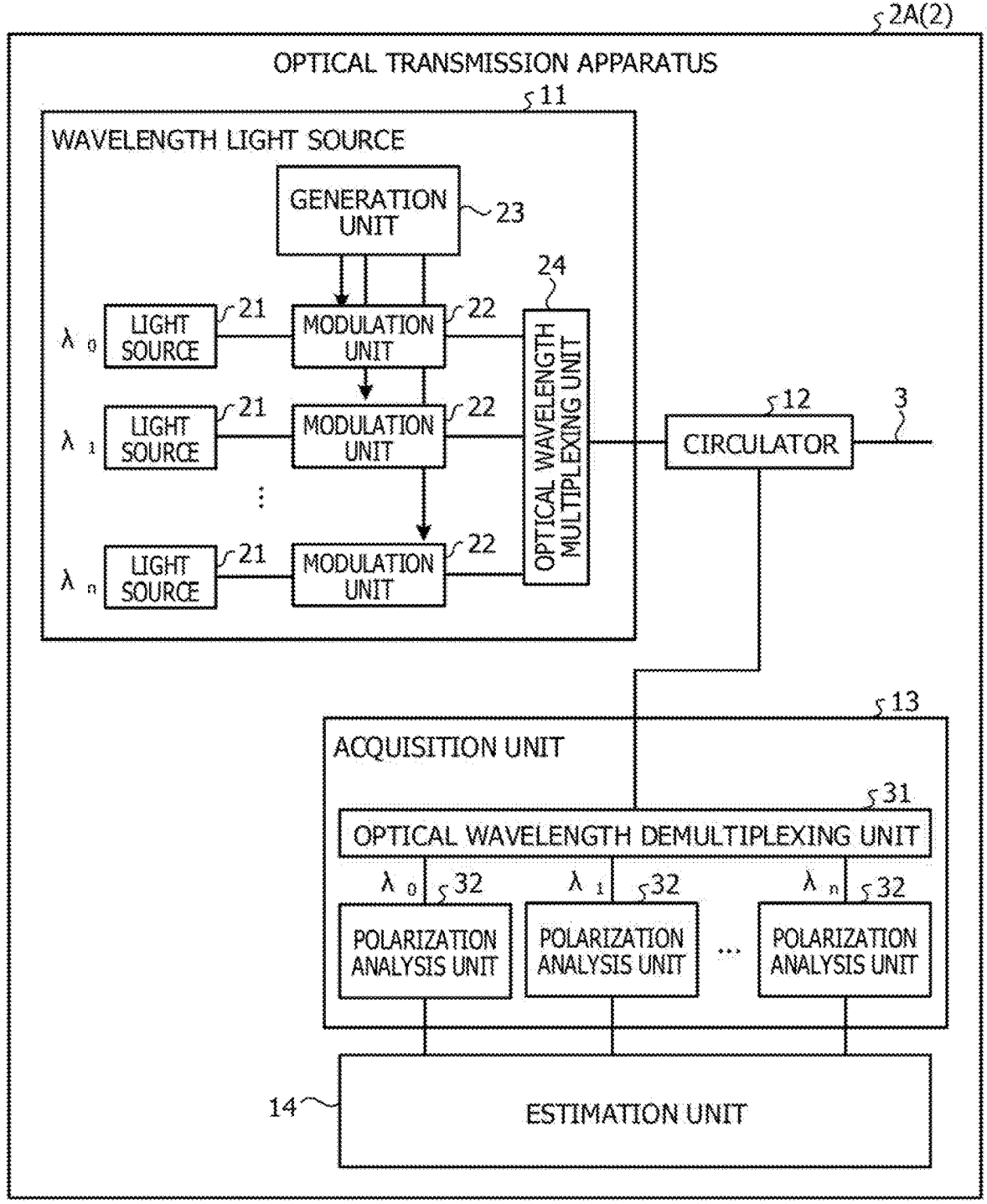
FIG. 2 is a block diagram illustrating an example of an optical transmission apparatus.

FIG. 2 is a block diagram illustrating an example of the optical transmission apparatus 2A. The wavelength light source 11 illustrated in FIG. 2 includes a plurality of light sources 21, a plurality of modulation units 22, a generation unit 23, and an optical wavelength multiplexing unit 24. Each light source 21 generates a signal light beam having a wavelength different from those of the other light sources 21. For example, the light source 21 of a wavelength $\lambda 0$ generates a signal light beam of $\lambda 0$, and the light source 21 of a wavelength $\lambda n$ generates a signal light beam of $\lambda n$. The modulation unit 22 is provided for each light source 21, modulates intensity (e.g., turns on or off, or the like) of the signal light beam transmitted from the light source 21 in response to a drive signal, and outputs the signal light beam to the optical wavelength multiplexing unit 24 at the time of ON. Note that the modulation unit 22 is, for example, an LN (LiNbO3) modulation unit, an electro-absorption (EA) modulation unit, a semiconductor optical amplifier (SOA), or the like. The generation unit 23 generates a drive signal for driving and controlling each modulation unit 22.

Figure 3:
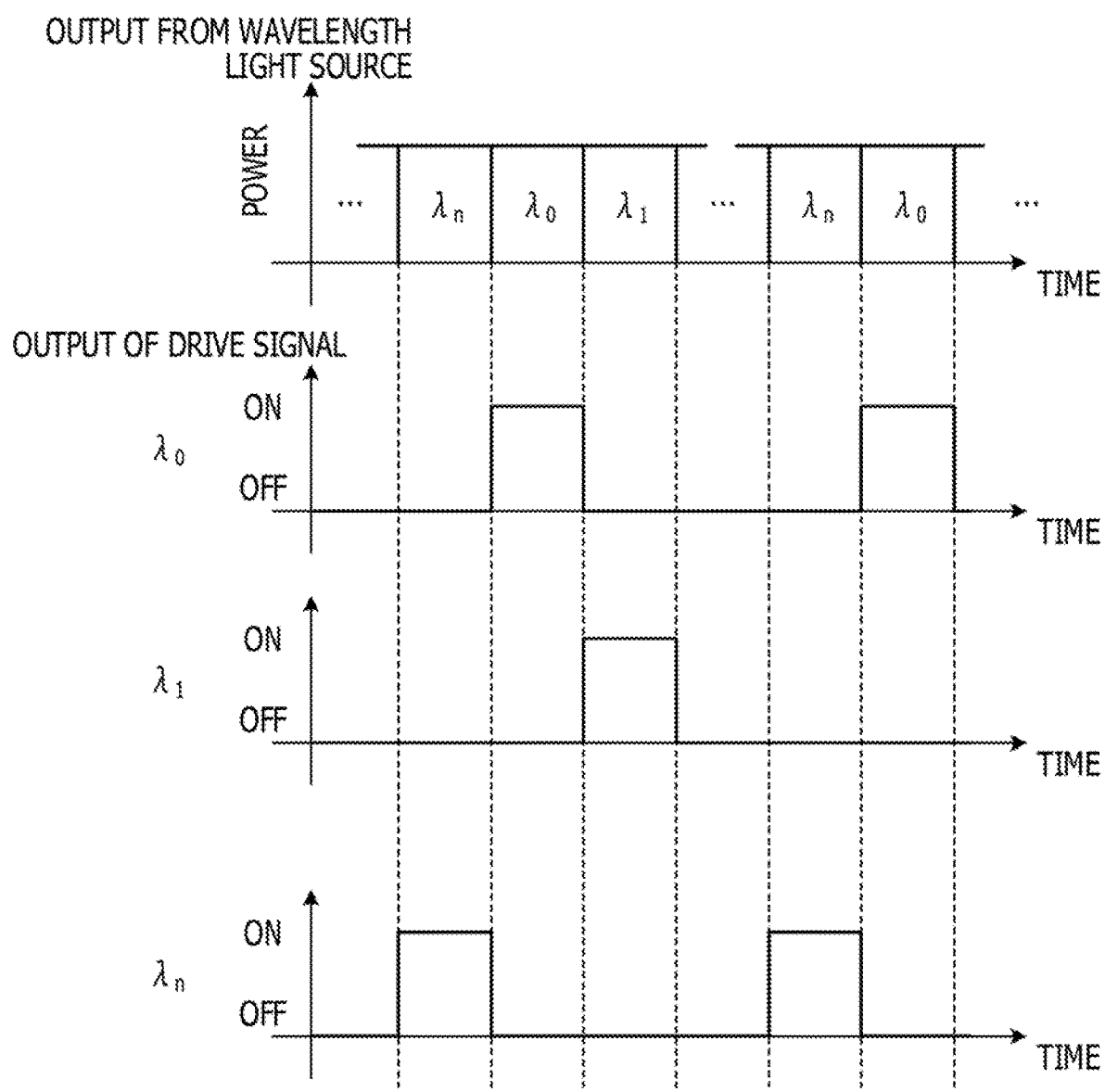
FIG. 3 is an explanatory diagram illustrating an example of an output timing of each signal light beam of a wavelength light source.

FIG. 3 is an explanatory diagram of an example of an output timing of each signal light beam of the wavelength light source 11. The generation unit 23 generates a drive signal for outputting a signal light beam from one of the plurality of light sources 21 to the optical wavelength multiplexing unit 24. The generation unit 23 sequentially generates drive signals so as to output signal light beams having the respective wavelengths to the optical wavelength multiplexing unit 24 in the unit of wavelength in the following order: $\lambda 0, \lambda 1, \lambda 2, \ldots, \lambda n, \lambda 0, \lambda 1, \lambda 2, \ldots$. That is, for example, the optical wavelength multiplexing unit 24 sequentially and continuously outputs optical pulses (signal light beams) having different wavelengths, with no gap on the time axis. Each modulation unit 22 turns on output of the signal light beam to the optical wavelength multiplexing unit 24 in a case where the drive signal indicates ON and turns off output of the signal light beam to the optical wavelength multiplexing unit 24 in a case where the drive, signal indicates OFF. The optical wavelength multiplexing unit 24 receives the signal light beams from the modulation units 22 in response to the drive signals ON and outputs the received signal light beams to the circulator 12.

The acquisition unit 13 includes an optical wavelength demultiplexing unit 31 and a plurality of polarization analysis units 32. The optical wavelength demultiplexing unit 31 is, for example, an array waveguide grating (AWG) and the like that outputs reflected light beams on the optical fiber 3 of the signal light beams from the circulator 12 to the respective polarization analysis units 32. The polarization analysis unit 32 is a polarimeter provided for each wavelength of a signal light beam. The polarization analysis unit 32 acquires a time-dependent polarization state based on signal intensity of a reflected light beam having an arbitrary wavelength. Devices are disposed only at one end of the optical fiber 3 in order to acquire the polarization state of the reflected light beam, and thus the polarization analysis unit 32 observes instantaneous polarization fluctuation. As a result, it is possible to achieve cost reduction, as compared to a technique in which workers are sent to both ends to dispose measuring devices.

Figure 4:
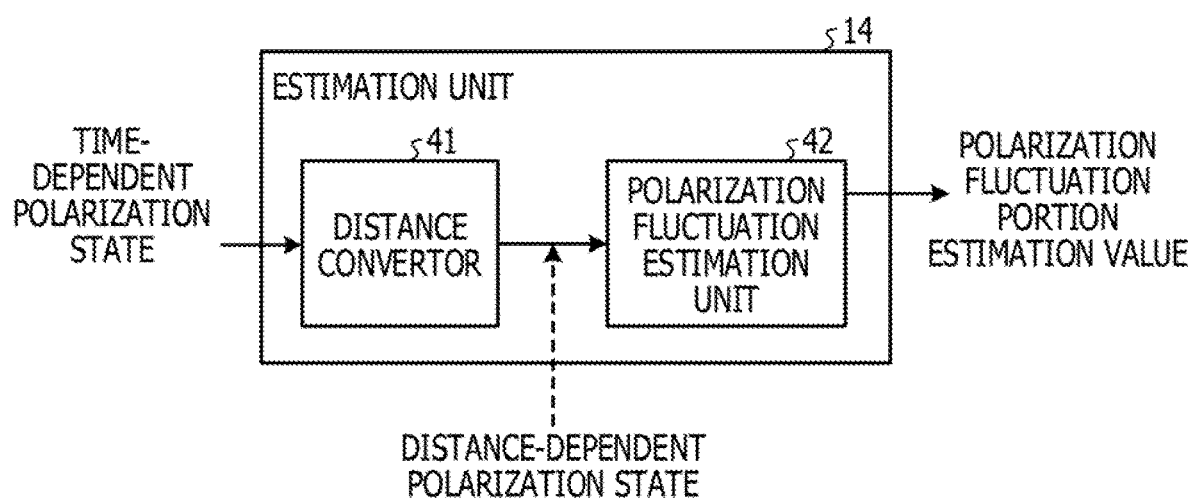
FIG. 4 is a block diagram illustrating an example of an estimation unit.

FIG. 4 is a block diagram illustrating an example of the estimation unit 14. The estimation unit 14 includes a distance convertor 41 and a polarization fluctuation estimation unit 42. The distance convertor 41 converts a time-dependent polarization state of each wavelength transmitted from each polarization analysis unit 32 into a distance-dependent polarization state. The distance convertor 41 calculates a distance z from cT/2n based on a distance z [m] in a fiber longitudinal direction, a fiber refractive index c, and a reception time T [seconds]. The polarization fluctuation estimation unit 42 estimates a polarization fluctuation portion where polarization fluctuation occurs based on the distance-dependent polarization state of each wavelength.

Figure 5A:
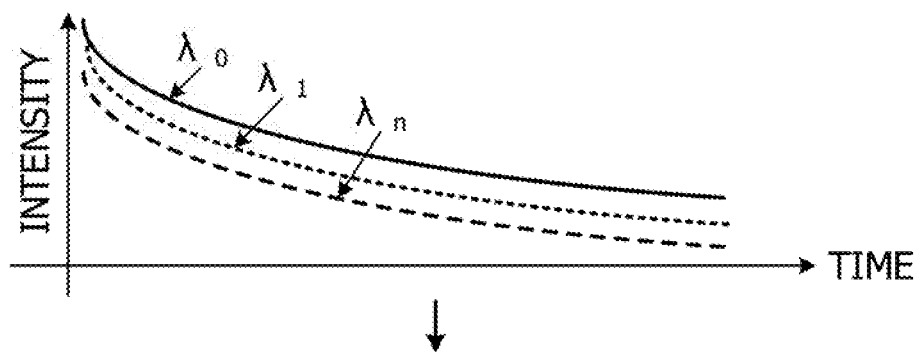
FIGS. 5A-5C are explanatory diagrams illustrating an example of conversion transition of signal intensity, a time-dependent polarization state, and a distance-dependent polarization state of reflected light.
Figure 5B:
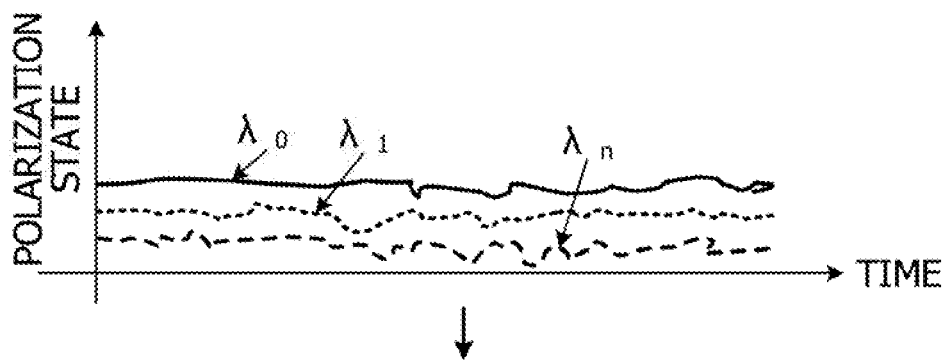
Figure 5C:
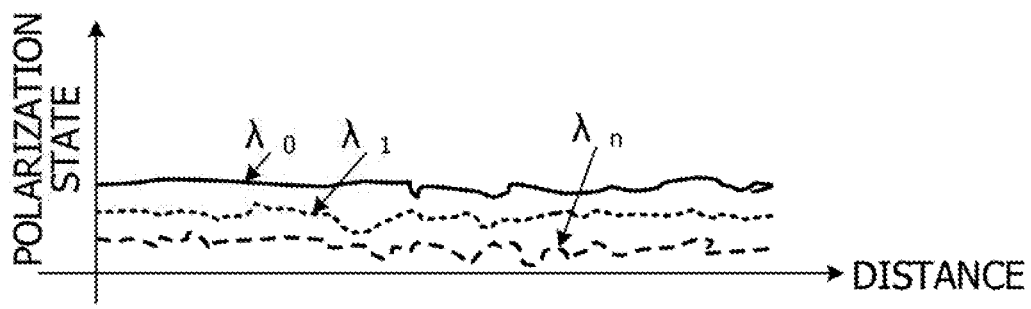

FIGS. 5A-5C are explanatory diagrams illustrating an example of conversion transition of signal intensity, a time-dependent polarization state, and a distance-dependent polarization state of reflected light. Note that, for convenience of explanation, only reflected light beams having wavelengths λ0, λ1, and λn will be described. The acquisition unit 13 converts the reflected light beam of each wavelength into signal intensity as illustrated in FIG. 5A. The acquisition unit 13 converts the signal intensity of each reflected light beam into a time-dependent polarization state as illustrated in FIG. 5B. The estimation unit 14 converts the time-dependent polarization state into a distance-dependent polarization state as illustrated in FIG. 5C.

Figure 6:
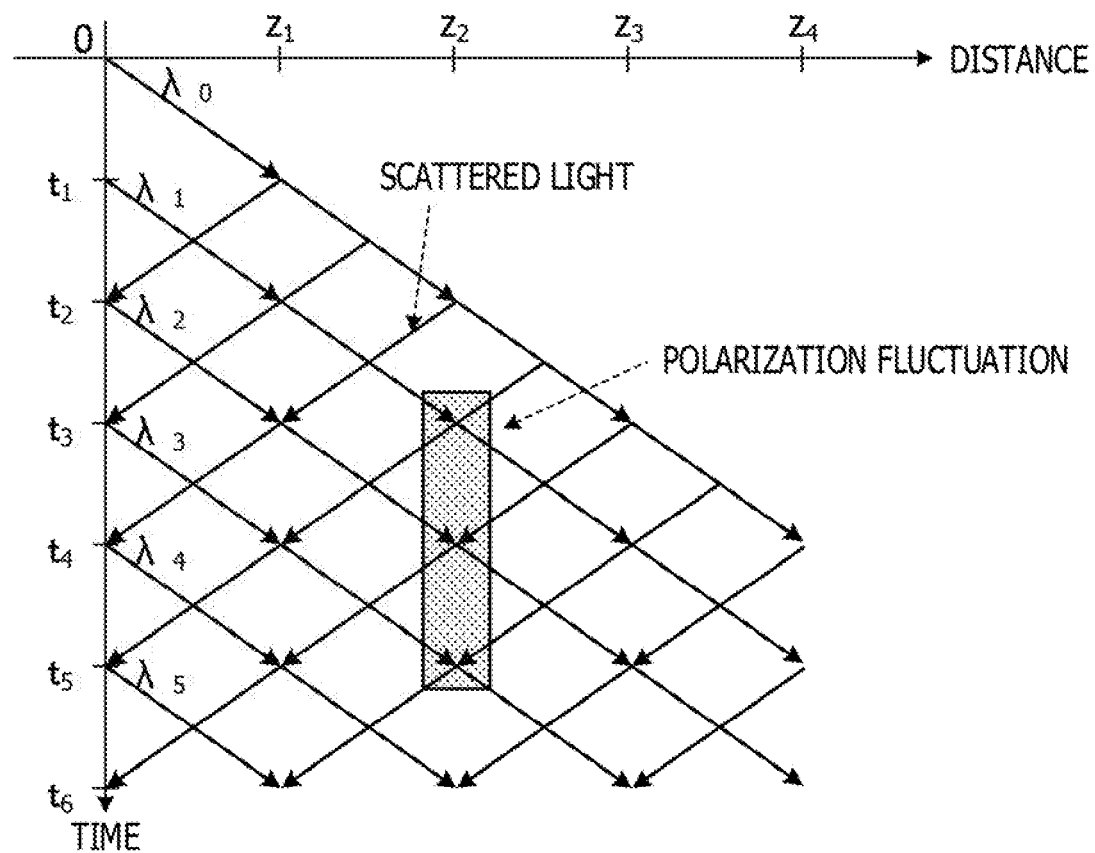
FIG. 6 is an explanatory diagram illustrating an example of processing for estimating a polarization fluctuation portion.
Figure 7:
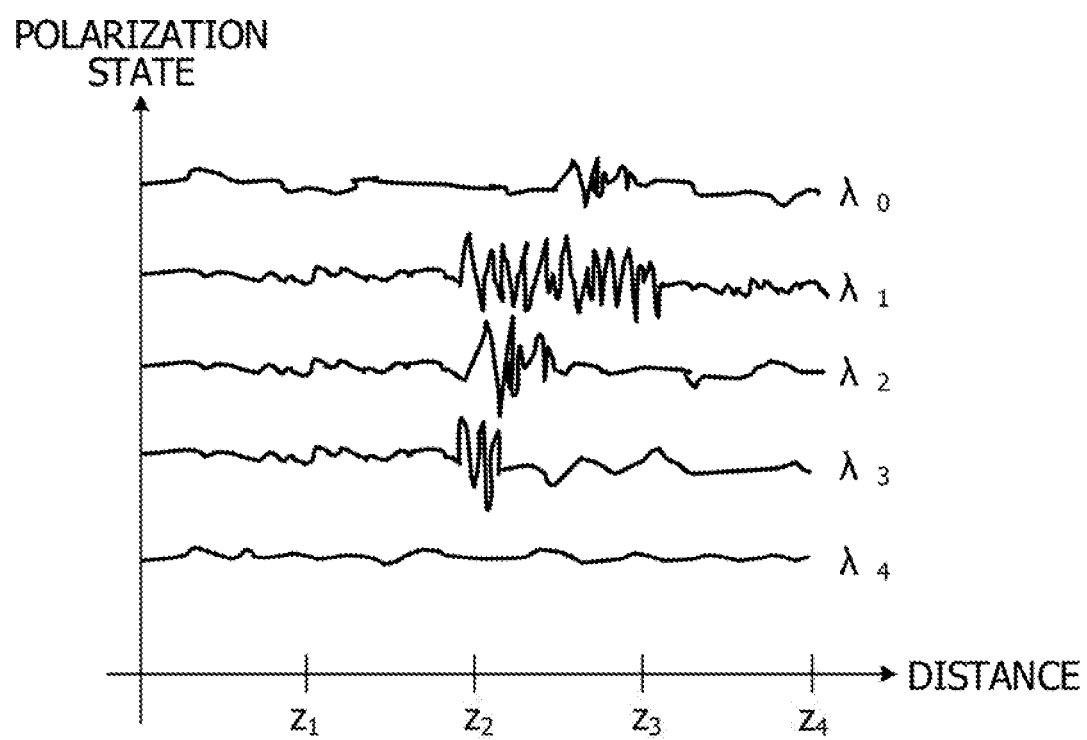
FIG. 7 is an explanatory diagram illustrating an example of a distance-dependent polarization state obtained when a polarization fluctuation portion is estimated.

FIGS. 6 and 7 are explanatory diagrams illustrating an example of processing for estimating a polarization fluctuation portion. As a method of estimating a polarization fluctuation portion, for example, a signal light beam of the wavelength λ0 is incident on the optical fiber 3 at a time t=0, and a signal light beam of the wavelength λ1 is incident on the optical fiber 3 at the time t=t1, and thereafter signal light beams of different wavelengths are incident on the optical fiber 3 at the time t=t2, t3, and t4. Further, it is assumed that a reflected light beam including a Rayleigh scattered light beam of the signal light beam having each wavelength is received, and polarization fluctuation occurs at a point z2 between the time t3 and t5.

In the signal light beam of the wavelength λ0, polarization fluctuation does not occur when the signal light beam passes through the point z2. However, polarization fluctuation occurs in a reflected light beam generated from the point z2 to a point z3. Next, in the signal light beams of the wavelengths λ1 and λ2, polarization fluctuation occurs when the signal light beams pass through the point z2. Further, reflected light beams are also affected by the polarization fluctuation. In the signal light beam of the wavelength λ3, polarization fluctuation occurs when the signal light beam passes through the point z2, but a reflected light beam thereof is not affected by the polarization fluctuation. Finally, in a signal light beam of a wavelength λ4, no polarization fluctuation is detected. As a result, a distance-dependent polarization state illustrated in FIG. 7 is obtained. The estimation unit 14 can estimate the point z2 as a polarization fluctuation portion based on the distance-dependent polarization states of the wavelengths λ0 to λ4 illustrated in FIG. 7.

Figure 8:
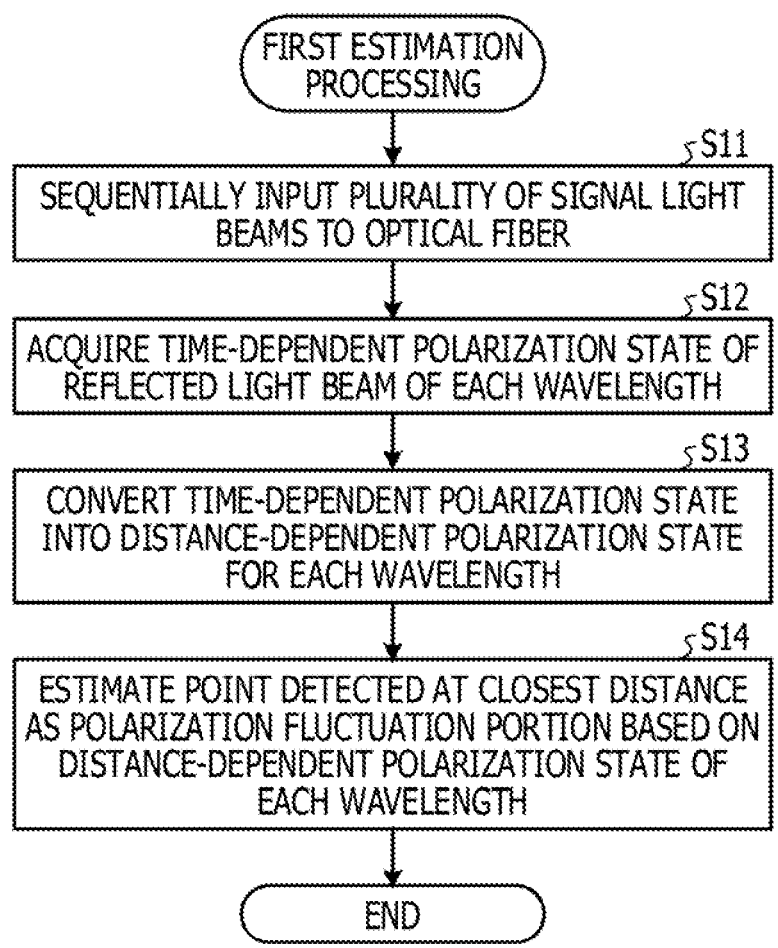
FIG. 8 is a flowchart illustrating an example of processing operation of an optical transmission apparatus regarding first estimation processing.

Next, operation of the optical transmission system 1 according to Embodiment 1 will be described. FIG. 8 is a flowchart illustrating an example of processing operation of the optical transmission apparatus 2A regarding first estimation processing. In FIG. 8, the wavelength light source 11 in the optical transmission apparatus 2A sequentially inputs signal light beams having a plurality of wavelengths to the optical fiber 3 so that the signal light beam of each wavelength is input at a time (Step S11). The acquisition unit 13 in the optical transmission apparatus 2A acquires a time-dependent polarization state of a reflected light beam on the optical fiber 3 of the signal light beam of each wavelength (Step S12). The acquisition unit 13 acquires the time-dependent polarization state of each wavelength. The estimation unit 14 in the optical transmission apparatus 2A converts the time-dependent polarization state into a distance-dependent polarization state for each wavelength (Step S13). Based on the distance-dependent polarization state of each wavelength, the estimation unit 14 estimates a point detected at the closest distance as a polarization fluctuation portion (Step S14) and terminates the processing operation illustrated in FIG. 8.

The optical transmission apparatus 2A that executes the first estimation processing sequentially and continuously inputs signal light beams having a plurality of wavelengths to the optical fiber 3, and converts a reflected light beam (scattered light beam) of each signal light beam into a time-dependent polarization state. The optical transmission apparatus 2A converts the time-dependent polarization state of each wavelength into a distance-dependent polarization state, and estimates, as a polarization fluctuation portion, a point where the polarization state fluctuates, which is a point at the closest distance, based on the converted distance-dependent polarization state. As a result, it is possible to estimate the polarization fluctuation portion with high accuracy.

The optical transmission apparatus 2A of Embodiment 1 estimates, as a polarization fluctuation portion, a point where a polarization state fluctuates, the point being detected at the closest distance, based on distance-dependent polarization state of a reflected light beam (scattered light beam) of each signal light beam. That is, for example, a polarization fluctuation portion is estimated based on distance-dependent polarization states of signal light beams having a plurality of wavelengths, instead of a single signal light beam. This makes it possible to improve estimation accuracy of the polarization fluctuation portion.

In the optical transmission apparatus 2A, it is unnecessary to dispose measuring devices at both ends of the transmission path of the optical fiber 3, and it is possible to measure polarization fluctuation by disposing measuring devices (acquisition unit 13 and estimation unit 14) at only one end of the optical fiber 3. As a result, it is possible to achieve cost reduction, as compared to a case where workers are sent to both ends to dispose measuring devices.

Further, for example, even in a case where an optical pulse train having an optical pulse width of approximately microseconds (several hundreds of nanoseconds) and a pulse interval of millisecond to second order (depending on measurement conditions) is used as a signal light beam, the optical transmission apparatus 2A can estimate polarization fluctuation occurring in a short time with high accuracy.

Note that there has been described a case where the polarization fluctuation estimation unit 42 of Embodiment 1 estimates a polarization fluctuation portion based on a distance-dependent polarization state of a reflected light beam having each wavelength converted in the distance convertor 41. However, the present embodiment is not limited thereto, and another embodiment will be described below as Embodiment 2.

Embodiment 2

Figure 9:
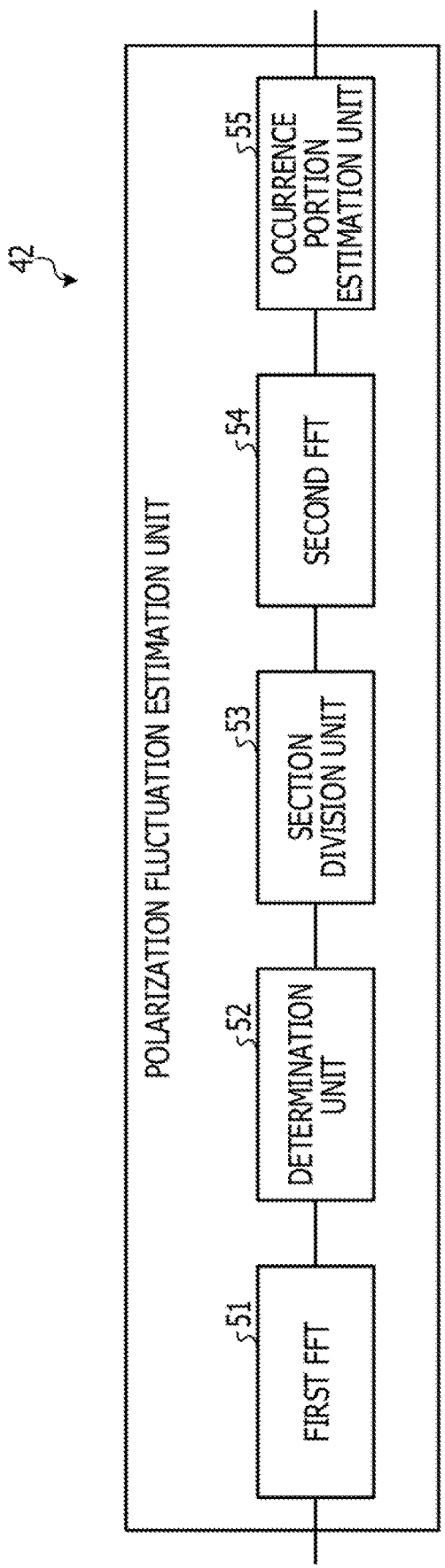
FIG. 9 is a block diagram illustrating an example of a polarization fluctuation estimation unit in an optical transmission apparatus of Embodiment 2.

FIG. 9 is an explanatory diagram illustrating an example of the polarization fluctuation estimation unit 42 in the optical transmission apparatus 2A of Embodiment 2. Note that description of overlapping configurations and operations is omitted by providing the same reference numerals to the same configurations as those of the optical transmission system 1 of Embodiment 1.

The polarization fluctuation estimation unit 42 includes a first fast Fourier transform (FFT) 51, a determination unit 52, a section division unit 53, a second FFT 54 and an occurrence portion estimation unit 55. The first FFT 51 transforms a distance-dependent polarization state into a frequency spectrum shape corresponding to a frequency shift. The determination unit 52 determines whether or not the frequency spectrum shape is changed. In a case where the frequency spectrum shape is changed, the section division unit 53 divides the distance-dependent polarization state into a plurality of sections. Note that each section has a predetermined time width. The second FFT 54 transforms the distance-dependent polarization state in each section into a frequency spectrum shape. The occurrence portion estimation unit 55 estimates a polarization fluctuation portion based on the frequency spectrum shape in each section.

Figure 10A:
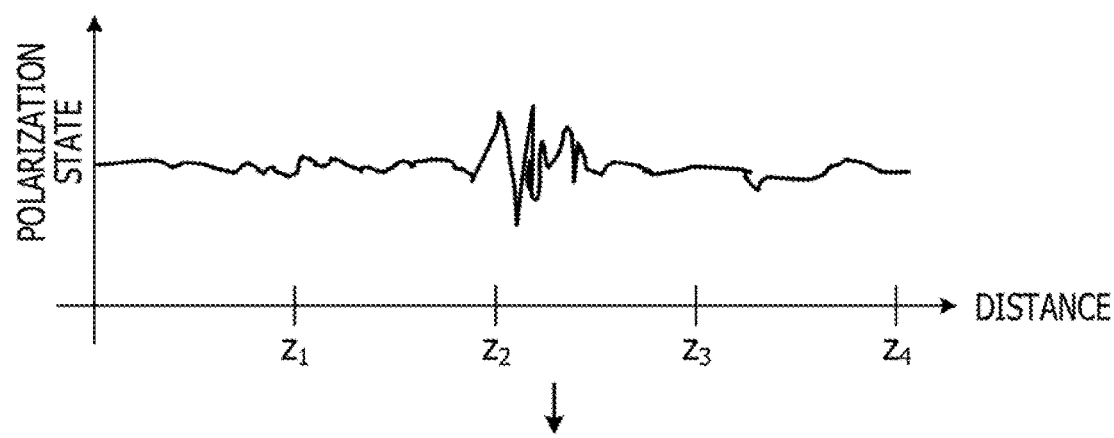
FIGS. 10A and 10B are explanatory diagrams illustrating on example of processing of a first FFT and a determination unit.
Figure 10B:
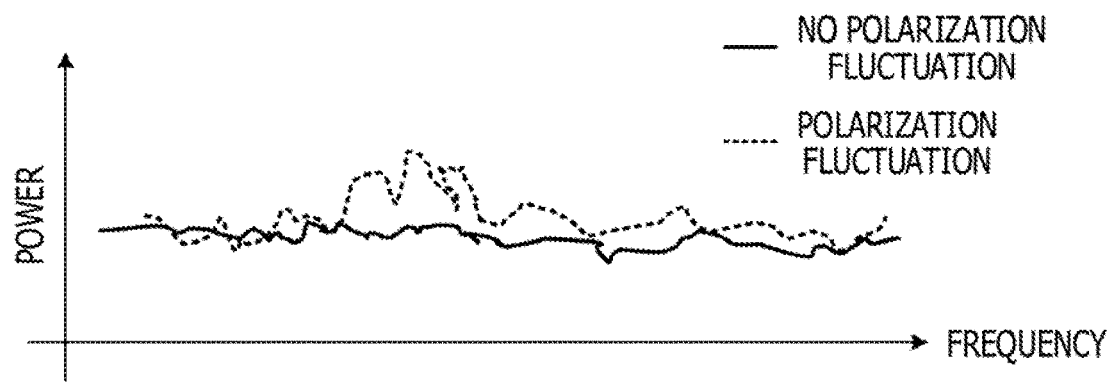

FIGS. 10A and 10B are explanatory diagrams illustrating an example of processing operation of the first FFT 51 and the determination unit 52. The first FFT 51 transforms a distance-dependent polarization state illustrated in FIG. 10A into a frequency spectrum shape illustrated in FIG. 10B. The determination unit 52 compares a current frequency spectrum shape (e.g., in which polarization fluctuation occurs) with a normal frequency spectrum shape in which no polarization fluctuation occurs, and determines whether or not the current frequency spectrum shape is changed.

Figure 11A:
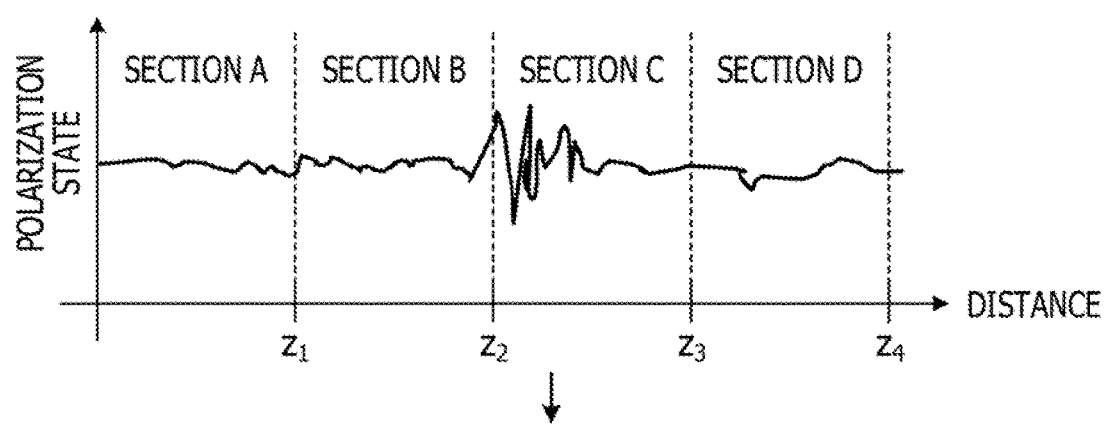
FIGS. 11A and 11B are explanatory diagrams illustrating an example of processing of a section division unit, a second FFT, and an occurrence portion estimation unit.
Figure 11B:
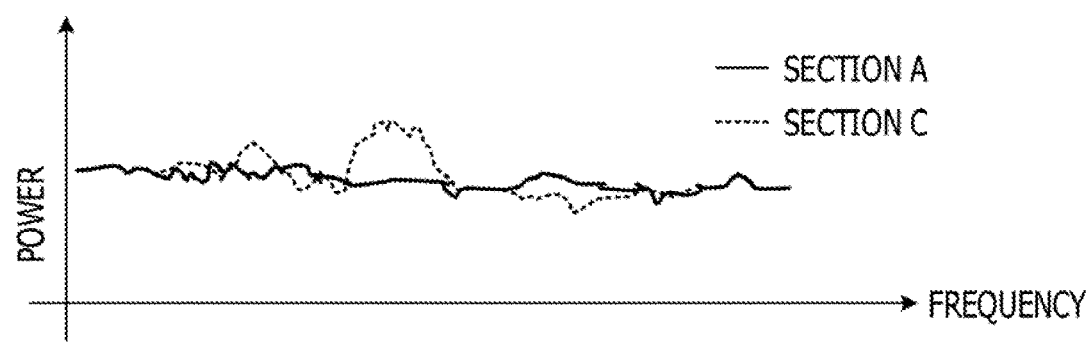

FIGS. 11A and 11B are explanatory diagrams illustrating an example of processing operation of the section division unit 53, the second FFT 54, and the occurrence portion estimation unit 55. In a case where the current frequency spectrum shape is changed, the section division unit 53 divides the distance-dependent polarization state into four sections A to D as illustrated in FIG. 11A. Further, the second FFT 54 transforms the distance-dependent polarization state in each section illustrated in FIG. 1A into a frequency spectrum shape illustrated in of FIG. 11B. The occurrence portion estimation unit 55 compares the frequency spectra in the respective sections, and, based on the comparison result, estimates a section in which the frequency spectrum has been changed as a polarization fluctuation portion.

Figure 12:
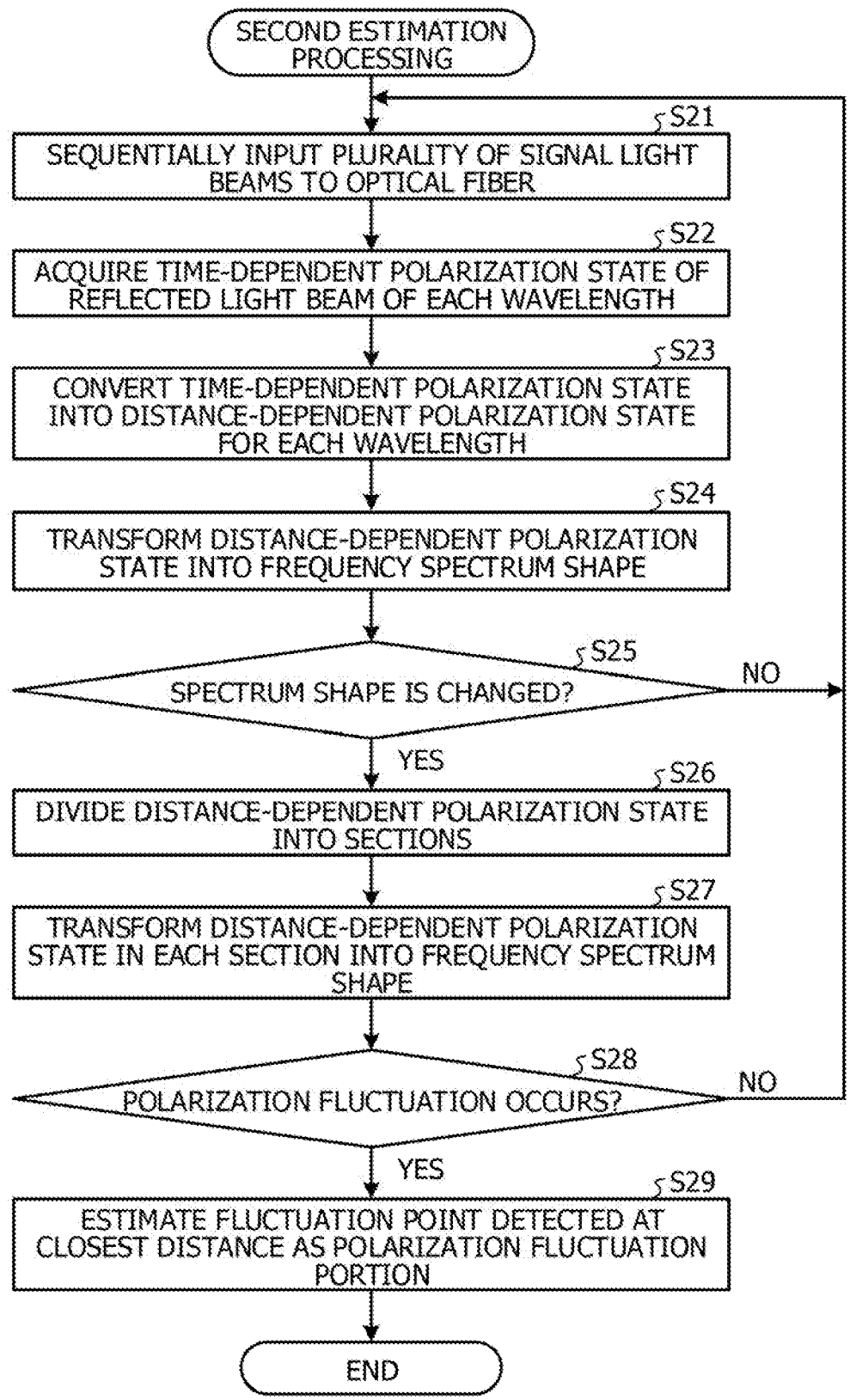
FIG. 12 is a flowchart illustrating an example of processing operation of an optical transmission apparatus regarding second estimator processing.

FIG. 12 is a flowchart illustrating an example of processing operation of the optical transmission apparatus 2A regarding second estimation processing. In FIG. 12, the wavelength light source 11 in the optical transmission apparatus 2A sequentially inputs signal light beams having a plurality of different wavelengths to the optical fiber 3 (Step S21). The acquisition unit 13 acquires a time-dependent polarization state of a reflected light beam on the optical fiber 3 of the signal light beam of each wavelength (Step S22). The estimation unit 14 converts the time-depend polarization state into a distance-dependent polarization state for each wavelength (Step S23). The first FFT 51 in the estimation unit 14 performs the Fourier transform to transform the distance-dependent polarization state of each wavelength into a frequency spectrum shape (Step S24).

The determination unit 52 in the estimation unit 14 determines whether or not the frequency spectrum shape is changed (Step S25). In a case where the frequency spectrum shape is changed (Yes in Step S25), the section division unit 53 in the estimation unit 14 divides the distance-dependent polarization state of each wavelength into a plurality of sections (Step S26). The second FFT 54 in the estimation unit 14 performs the Fourier transform to transform the distance-dependent polarization state in each section into a frequency spectrum shape (Step S27). The occurrence portion estimation unit 55 in the estimation unit 14 determines whether or not polarization fluctuation occurs in the frequency spectrum shape that has been subjected to the Fourier transform (Step S28).

In a case where polarization fluctuation occurs in the frequency spectrum shape that has been subjected to the Fourier transform (Yes in Step S28), the occurrence portion estimation unit 55 estimates a point detected at the closest distance as a polarization fluctuation portion (Step S29), and terminates the processing operation illustrated in FIG. 12. In a case where the frequency spectrum shape is not changed (No in Step S25), the determination unit 52 proceeds to Step S21 to sequentially input the signal light beams to the optical fiber 3. In a case where polarization fluctuation does not occur in the frequency spectrum shape (No in Step S28), the occurrence portion estimation unit 55 proceeds to Step S21.

Note that, in a case where there are sufficient calculation resources, the estimation unit 14 may execute the processing of estimating a polarization fluctuation portion in and after Step S26, without executing the determination processing in the determination unit 52. The processing operation can be appropriately changed. As a result, even in a case where it is difficult to detect polarization fluctuation based on a polarization state because of large noise, it is possible to accurately detect polarization fluctuation by performing analysis on the frequency axis.

The optical transmission apparatus 2A that executes the second estimation processing performs Fourier transform to transform a distance-dependent polarization state of each wavelength into a frequency spectrum shape, and determines whether or not the frequency spectrum shape is changed. In a case where the frequency spectrum shape is changed, the optical transmission apparatus 2A divides the distance-dependent polarization state of each wavelength into a plurality of sections, and performs Fourier transform to transform the distance-dependent polarization state in each section into a frequency spectrum shape. In a case where polarization fluctuation occurs in the frequency spectrum shape that has been subjected to the Fourier transform, the optical transmission apparatus 2A estimates a point detected at the closest distance as a polarization fluctuation portion. As a result, it is possible to estimate the polarization fluctuation portion with high accuracy. Furthermore, in a case where it is difficult to detect polarization fluctuation based on a polarization state because of large noise, it is possible to accurately detect polarization fluctuation by performing analysis on the frequency axis.

Note that there has been described a case where the estimation unit 14 in the optical transmission apparatus 2A of Embodiments 1 and 2 estimates a polarization fluctuation portion based on a distance-dependent polarization state. However, the present embodiment is not limited to the polarization fluctuation portion, and, for example, a polarization fluctuation time width, a polarization fluctuation speed, and a polarization fluctuation angle may be estimated.

Figure 13:
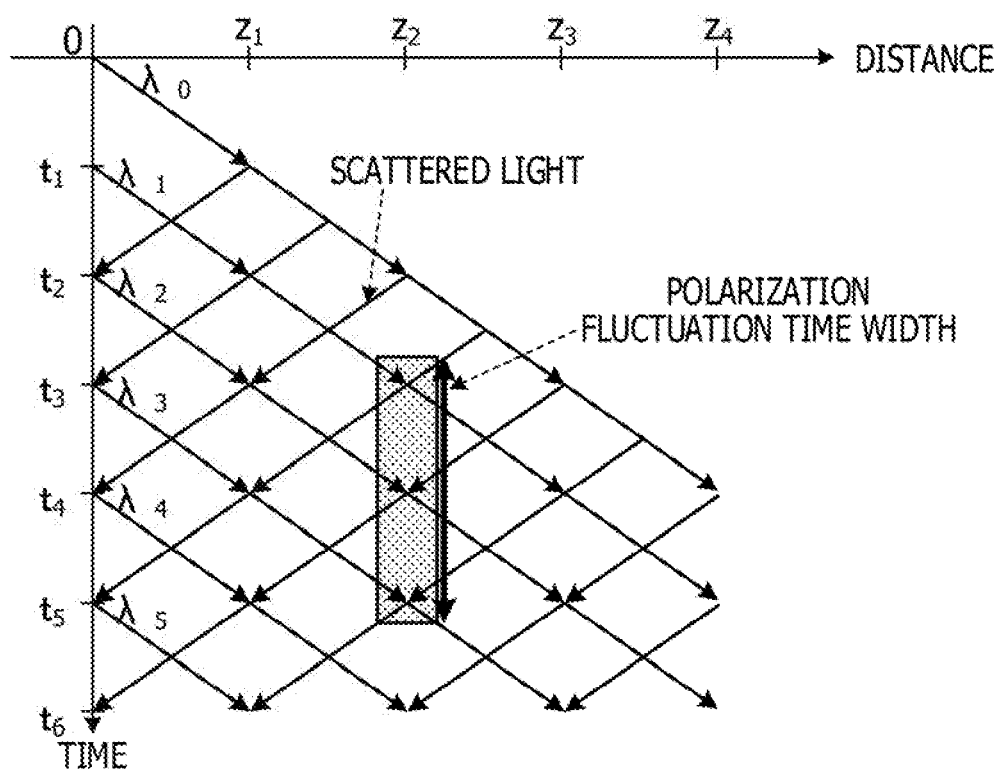
FIG. 13 is an explanatory diagram illustrating an example of processing for estimating a polarization fluctuation time width.

FIG. 13 is an explanatory diagram illustrating an example of processing for estimating a polarization fluctuation time width. The estimation unit 14 estimates the polarization fluctuation time width based on the estimated polarization fluctuation portion, the distance-dependent polarization state of each wavelength, and the time-dependent polarization state of each wavelength. In the example of FIG. 13, fluctuation in the polarization state occurs when the signal light beam of the wavelength λ1 transmitted at the time t1 reaches the point z2, and the fluctuation in the polarization state continues until the signal light beam of the wavelength λ3 transmitted at the time t3 reaches the point z2 in an outward path. At this time, the polarization fluctuation time width is t3−t2. Further, a polarization fluctuation occurrence time is a time obtained by adding propagation time (=z2/(c/n)) to the point z2 to the time t1. The estimation unit 14 estimates not only the polarization fluctuation portion but also the polarization fluctuation time width, and notifies a user of the polarization fluctuation time width. As a result, by knowing the polarization fluctuation time width, it is possible to identify the cause of the occurrence of polarization fluctuation and to check (double check) an estimation result of the polarization fluctuation portion.

Figure 14A:
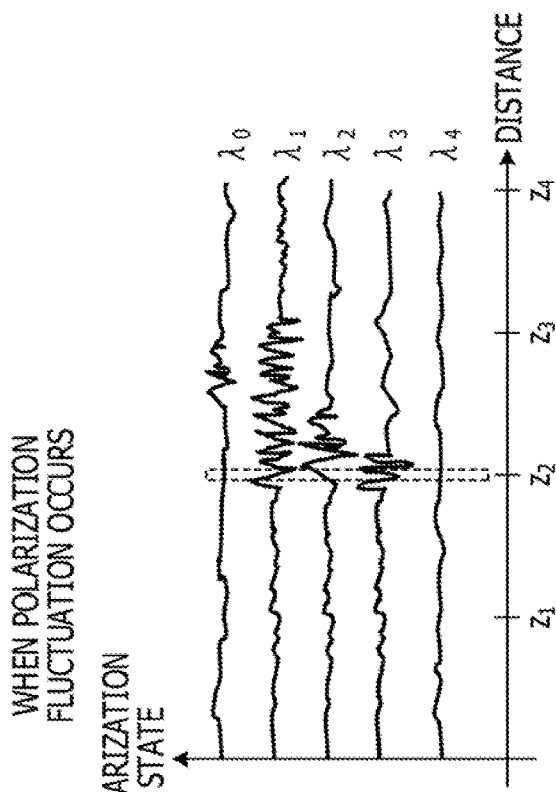
FIGS. 14A and 14B are explanatory diagrams illustrating an example of processing for estimating polarization fluctuation speed and angle.
Figure 14B:
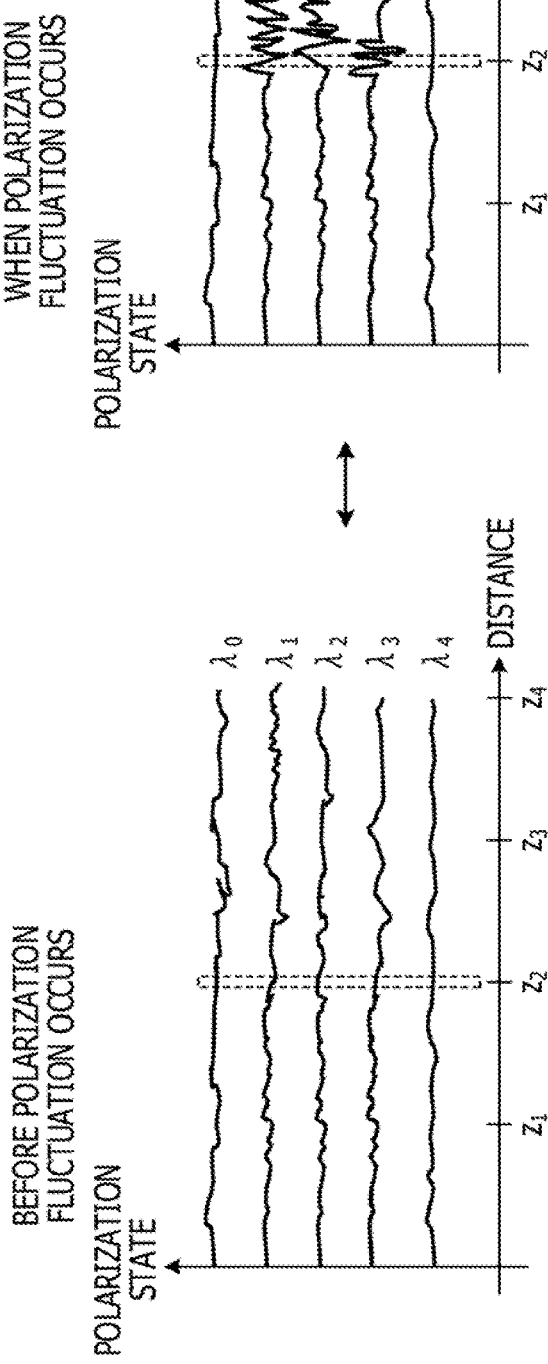

FIGS. 14A and 14B are explanatory diagrams illustrating an example of processing for estimating polarization fluctuation speed and angle. Based on the estimated polarization fluctuation portion and the time-dependent and distance-dependent polarization states of each wavelength, the estimation unit 14 acquires a difference between the distance-dependent polarization state at a time before polarization fluctuation occurs as illustrated in FIG. 14A and the distance-dependent polarization state at a time when the polarization fluctuation occurs as illustrated in FIG. 14B. Based on the difference, the estimation unit 14 estimates the polarization fluctuation speed and the polarization fluctuation angle at which the polarization state fluctuates. The estimation unit 14 notifies the user of not only the polarization fluctuation portion but also the polarization fluctuation angle and speed. A polarization state of scattered light rotates with propagation in the optical fiber 3. In a case where the state is the same before and at the time of occurrence of the polarization fluctuation, it is possible to accurately estimate the speed and angle. Meanwhile, if the state changes, there is a restriction that the accuracy is deteriorated. As a result, it is useful for identifying the cause of the polarization fluctuation and examining countermeasures therefor.

Further, the modulation units 22 in the wavelength light source 11 of Embodiments 1 and 2 may be omitted, and output from the light sources 21 may be directly turned on or off.

Figure 15:
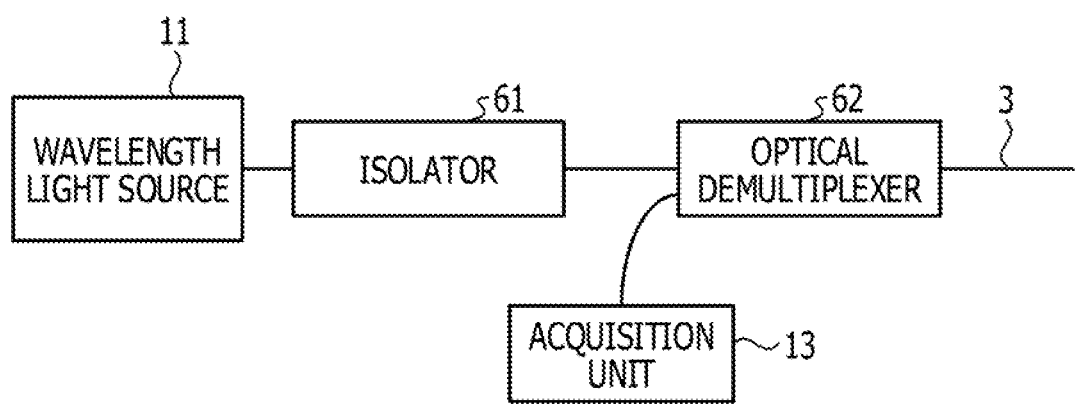
FIG. 15 is an explanatory diagram illustrating an alternative example of a circulator.

Further, there has been described a case where the circulator 12 causes reflected light beams from the optical fiber 3 to be incident on the estimation unit 14 in the optical transmission apparatus 2A of Embodiments 1 and 2. However, the present embodiment is not limited to the circulator 12, and a configuration illustrated in FIG. 15 may be employed. FIG. 15 is an explanatory diagram illustrating an alternative example of the circulator 12.

As illustrated in FIG. 15, an isolator 61 and an optical demultiplexer 62 are disposed between the wavelength light source 11 and the optical fiber 3. The optical demultiplexer 62 demultiplexes reflected light beams from the optical fiber 3 to the acquisition unit 13. Further, the isolator 61 desirably prevents the reflected light beams from the optical demultiplexer 62 from being incident on the wavelength light source 11. The acquisition unit 13 causes the reflected light beams to be incident via the optical demultiplexer 62, without using the circulator 12.

Further, there has been described the wavelength light source 11 including the plurality of light sources 21 that emits signal light beams having different wavelengths in the optical transmission apparatus 2A of Embodiments 1 and 2. However, the present embodiment is not limited thereto, and a wavelength-sweeping light source 11A that sweeps signal light beams having different wavelengths may be used.

Figure 16:
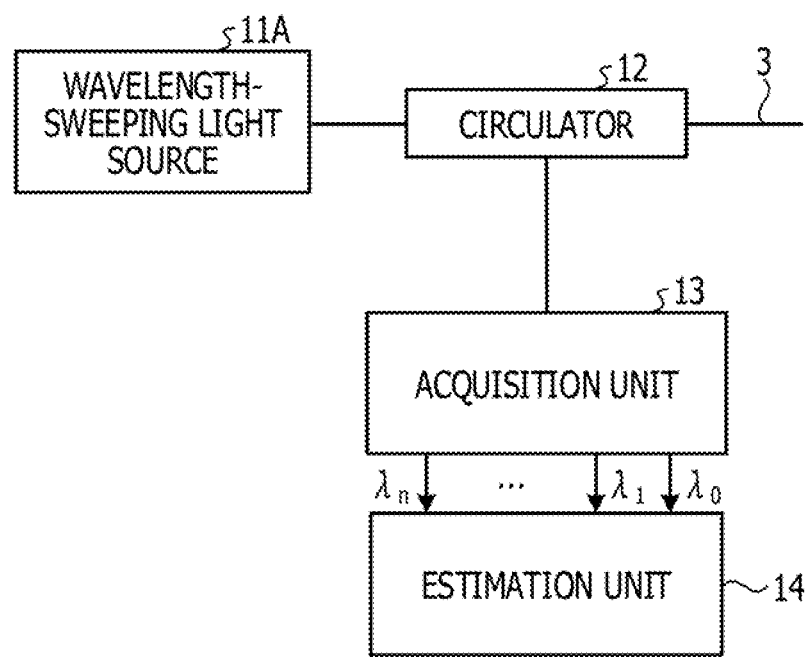
FIG. 16 is an explanatory diagram illustrating an alternative example of a wavelength light source (wavelength-sweeping light source)
Figure 17:
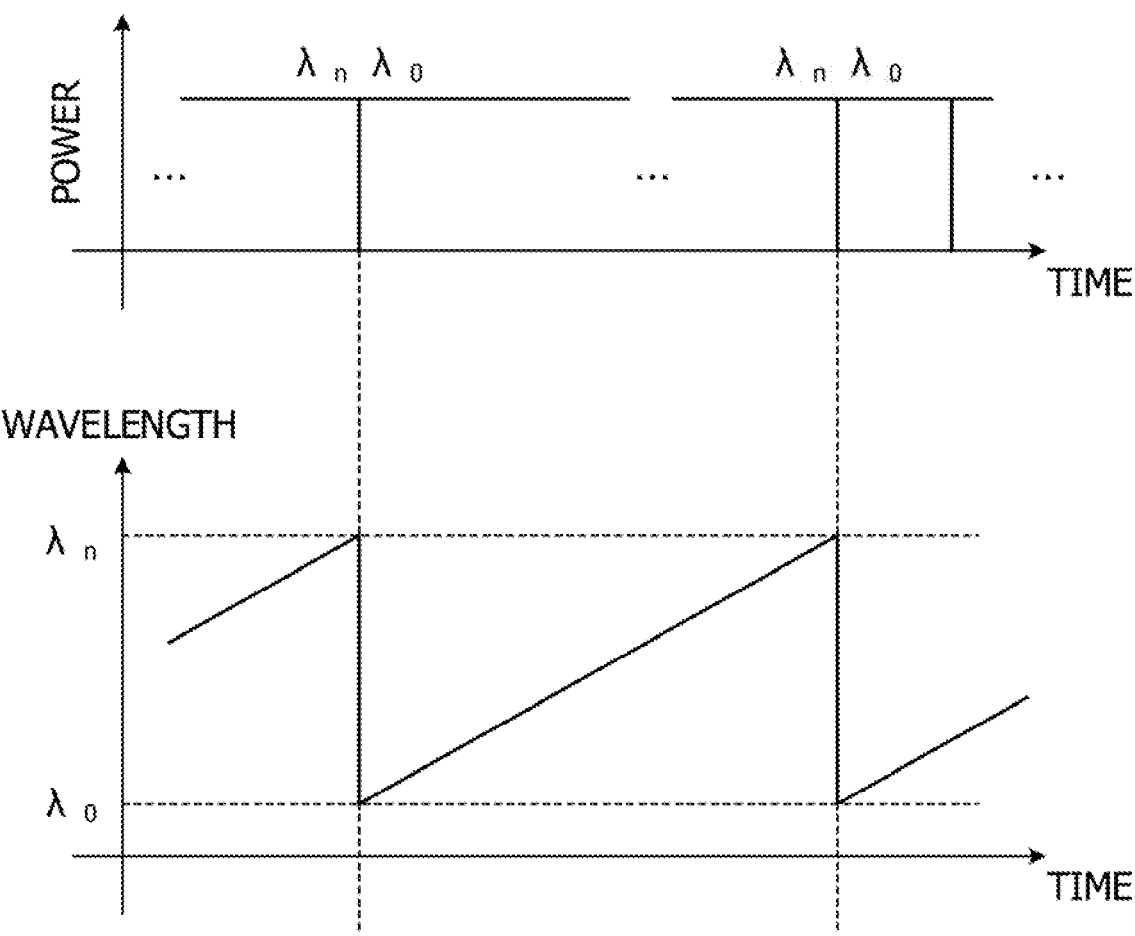
FIG. 17 is an explanatory diagram illustrating an example of an output timing of each signal light beam of a wavelength-sweeping light source.

FIG. 16 is an explanatory diagram illustrating an example of an alternative example of the wavelength light source 11 (wavelength-sweeping light source 11A). FIG. 17 is an explanatory diagram illustrating an example of an output timing of each signal light beam of the wavelength-sweeping light source 11A. For example, as illustrated in FIG. 17, the wavelength-sweeping light source 11A repeats wavelength sweeping in each predetermined section and outputs a signal light beam. The wavelength-sweeping light source 11A outputs a signal light beam of the wavelength λn while sweeping the wavelength λn from the wavelength λ0 in each predetermined section, and, when the wavelength-sweeping light source 11A reaches the predetermined section, repeatedly outputs a signal light beam of the wavelength λn while sweeping the wavelength λn from the wavelength λ0 in the next predetermined section.

Embodiment 3

Figure 18:
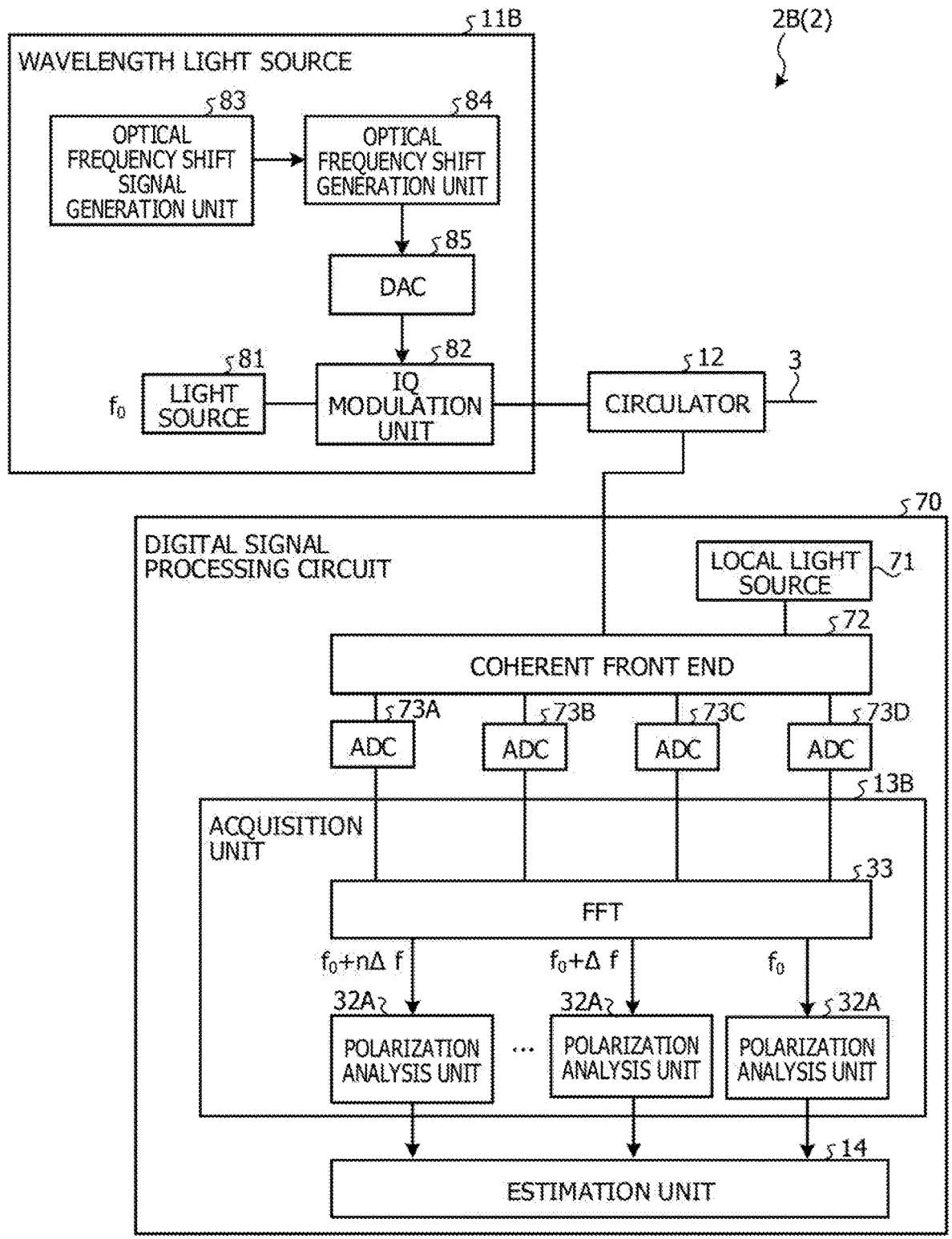
FIG. 18 is a block diagram illustrating an example of an optical transmission apparatus of Embodiment 3.

FIG. 18 is a block diagram illustrating an example of an optical transmission apparatus 2B of Embodiment 3. Note that description of overlapping configurations and operations is omitted by providing the same reference numerals to the same configurations as those of the optical transmission system 1 of Embodiment 1.

The optical transmission apparatus 2B (2) illustrated in FIG. 18 includes a wavelength light source 11B, a circulator 12, and a digital signal processing circuit 70. The wavelength light source 11B outputs signal light beams having different wavelengths to the optical fiber 3 via the circulator 12. The circulator 12 outputs the signal light beams having the different wavelengths to the optical fiber 3, and also outputs reflected light beams of the signal light beams from the optical fiber 3 to the digital signal processing circuit 70.

The wavelength light source 11B is also used as a digital coherent transmitter. The wavelength light source 11B includes a light source 81, an IQ modulation unit 82, an optical frequency shift signal generation unit 83, an optical frequency shift generation unit 84, and a digital analog converter (DAC) 85. The light source 81 generates a signal light beam having a single wavelength. The optical frequency shift signal generation unit 83 generates a frequency shift signal. The optical frequency shift generation unit 84 generates a frequency shift amount as shown by Mathematical expression 1. Eout denotes output of the IQ modulation unit 82, Ein denotes input of the IQ modulation unit 82, e(j2nΔft) denotes an optical frequency shift amount, and Δf denotes an optical frequency shift amount.

[Math. 1]

$$E_{out} = e^{(j2n\Delta ft)} E_{in} \qquad (1)$$

The DAC 85 converts the frequency shift amount into an analog signal. The IQ modulation unit 82 optically modulates the signal light beam from the light source 81 in accordance with the frequency shift amount, and generates a signal light beam having an identifiably different frequency shift amount.

The digital signal processing circuit 70 is also used as a digital coherent receiver. The digital signal processing circuit 70 includes a local light source 71, a coherent front end 72, an analog-to-digital convertor (ADC) 73, an acquisition unit 13B, and an estimation unit 14. The local light source 71 generates local light. The coherent front end 72 receives a reflected light beam on the optical fiber 3 of the signal light beam transmitted via the circulator 12 in accordance with the local light. The ADC 73 converts, the reflected light beam into a digital signal, and outputs the reflected light beam that has been converted into the digital signal to the acquisition unit 13B.

The acquisition unit 13B includes an FFT 33 and a plurality of polarization analysis units 32A. The FFT 33 separates the reflected light beam into reflected light beams having respective wavelength components (optical frequency shift light). In a case where pieces of electric field information on X polarization and Y polarization separated to have the respective wavelength components are denoted by Ex and Ey, the polarization analysis unit 32A can acquire a polarization state from Mathematical expression 2 by introducing the Stokes parameter in order to numerically express the polarization state.

[Math. 2]

$$S_0 = |E_x|^2 + |E_y|^2$$

$$S_1 = |E_x|^2 - |E_y|^2$$

$$S_2 = 2Re(E_x E_y^*)$$

$$S_3 = 2Im(E_x E_y^*) \quad (2)$$

FIG. 19 is an explanatory diagram illustrating an example of an output timing of each signal light beam of the wavelength light source 11B of Embodiment 3. The IQ modulation unit 82 in the wavelength light source 11B optically modulates a signal light beam having a single wavelength from the light source 81 in accordance with the frequency shift amount, and sequentially outputs the optically-modulated signal light beams having different frequency shift amounts.

Next, operation of the optical transmission apparatus 2B of Embodiment 3 will be described. The wavelength light source 11B in the optical transmission apparatus 2B performs optical modulation in the IQ modulation unit 82, and sequentially inputs optically-modulated signal light beams having a plurality of different frequency shift amounts to the optical fiber 3.

The coherent front end 72 separates received light beams (reflected light beams) from the circulator 12 into an X and Y polarization, components. Note that the X polarization component is a horizontal polarization component, and the Y polarization component is a vertical polarization component. The coherent front end 72 causes local light to interfere with the X polarization component of the reflected light beams, thereby acquiring an I component and a Q component, and also causes local light to interfere with the Y polarization component of the reflected light beams, thereby acquiring an I component and a Q component. Note that the I component is an in-phase axis component, and the Q component is an orthogonal axis component.

The coherent front end 72 outputs the I component of the X polarization component of the reflected light beams to an ADC 73A, and also outputs the Q component of the X polarization component of the reflected light beams to an ADC 73B. Further, the coherent front end 72 outputs the I component of the Y polarization component of the reflected light beams to an ADC 73C, and outputs the Q component of the Y polarization component of the reflected light beams to an ADC 73D. The ADC 73A converts the I component of the X polarization component of the reflected light beams into a digital signal and outputs the digital signal to the FFT 33. The ADC 73B converts the Q component of the X polarization component of the reflected light beams into a digital signal and outputs the digital signal to the FFT 33. Further, the ADC 73C converts the I component of the V polarization component of the reflected light beams into a digital signal and outputs the digital signal to the FFT 33. The ADC 73D converts the Q component of the polarization component of the reflected light beams into a digital signal and outputs the digital signal to the FFT 33.

The FFT 33 performs Fourier transform on the I and Q components in the X polarization component, which have been converted into the digital signals, and the I and Q components in the Y polarization component, which have been converted into the digital signals, and demodulates the X polarization component and the Y polarization component into demodulation signals of the reflected light beams, and outputs the demodulation signals to the polarization analysis units 32A corresponding to the reflected light beams. Each polarization analysis unit 32A acquires a time-dependent polarization state from the demodulation signal of the reflected light beam having the corresponding wavelength transmitted from the FFT 33. The estimation unit 14 converts the time-dependent polarization state into a distance-dependent polarization state for each wavelength. Based on the distance-dependent polarization state of each wavelength, the estimation unit 14 estimates a point detected at the closest distance as a polarization fluctuation portion.

The optical transmission apparatus 2B of Embodiment 3 also serves as a digital coherent transmitter and receiver for normal long-distance transmission, and acquires reflected light beams of signal light beams having different wavelengths as a time-dependent polarization state. The optical transmission apparatus 28 converts the time-dependent polarization state of each wavelength into a distance-dependent polarization state, and estimates, as a polarization fluctuation portion, a point where the polarization state fluctuates, which is a point at the closest distance, based on the converted distance-dependent polarization state. As a result, it is possible to estimate the polarization fluctuation portion with high accuracy while reducing costs thereof.

Figure 20:
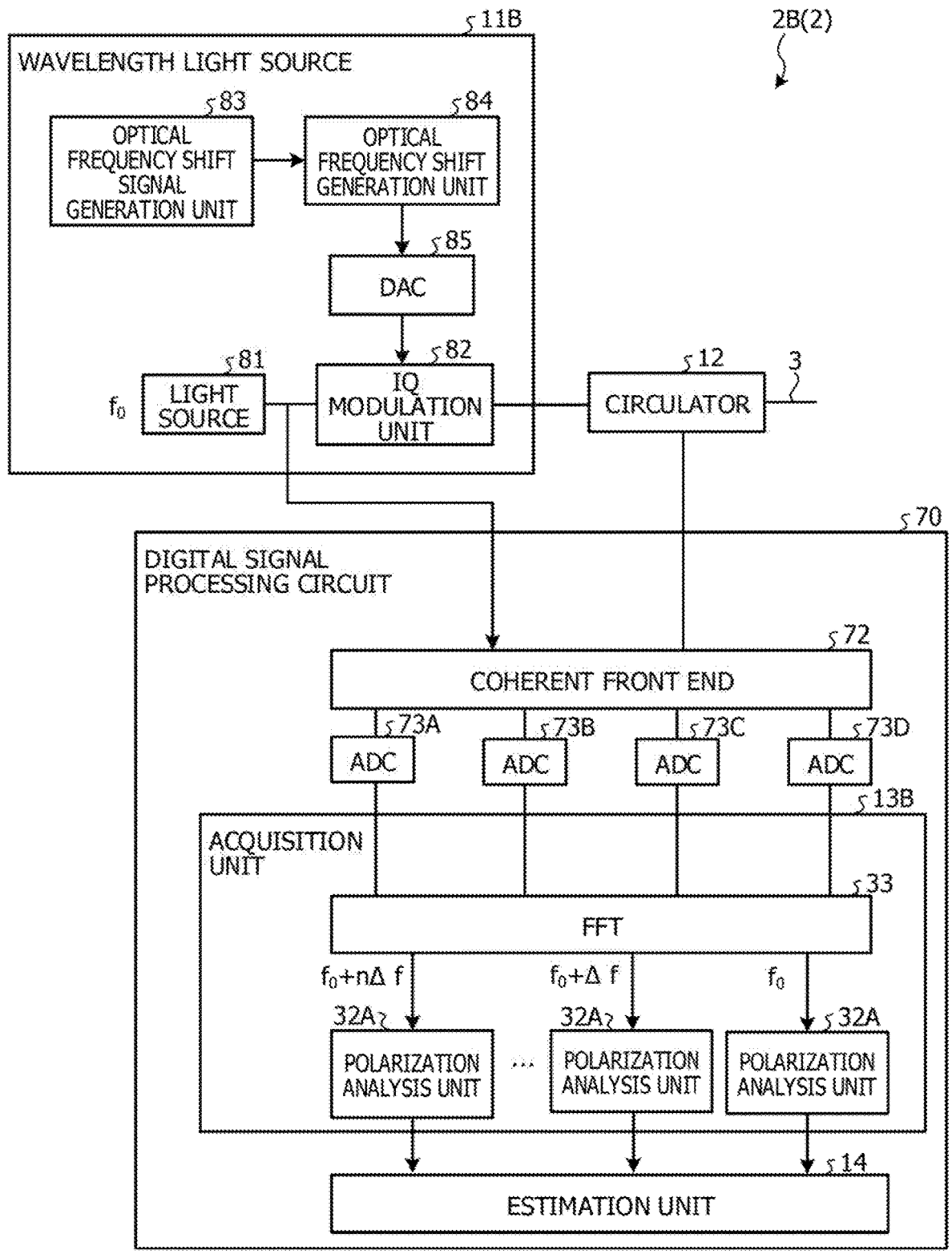
FIG. 20 is a block diagram illustrating an alternative example of the optical transmission apparatus of Embodiment 3.

Note that there has been described a case where the digital signal processing circuit 70 in the optical transmission apparatus 28 of Embodiment 3 inputs local light from the local light source 71 to the coherent front end 72. However, the present embodiment is not limited to the local light. Instead of the local light, a signal light beam from the light source 81 may be input to the coherent front end 72 as the local light. The local light can be appropriately changed. FIG. 20 is a block diagram illustrating an alternative example of the optical transmission apparatus 28 of Embodiment 3.

The coherent front end 72 illustrated in FIG. 20 inputs a signal light beam from the light source 81 to the coherent front end 72 as local light, instead of the local light. As a result, the local light source 71 is unnecessary, and thus the light source 81 that generates a transmission signal can also serve as a local light source.

Figure 21:
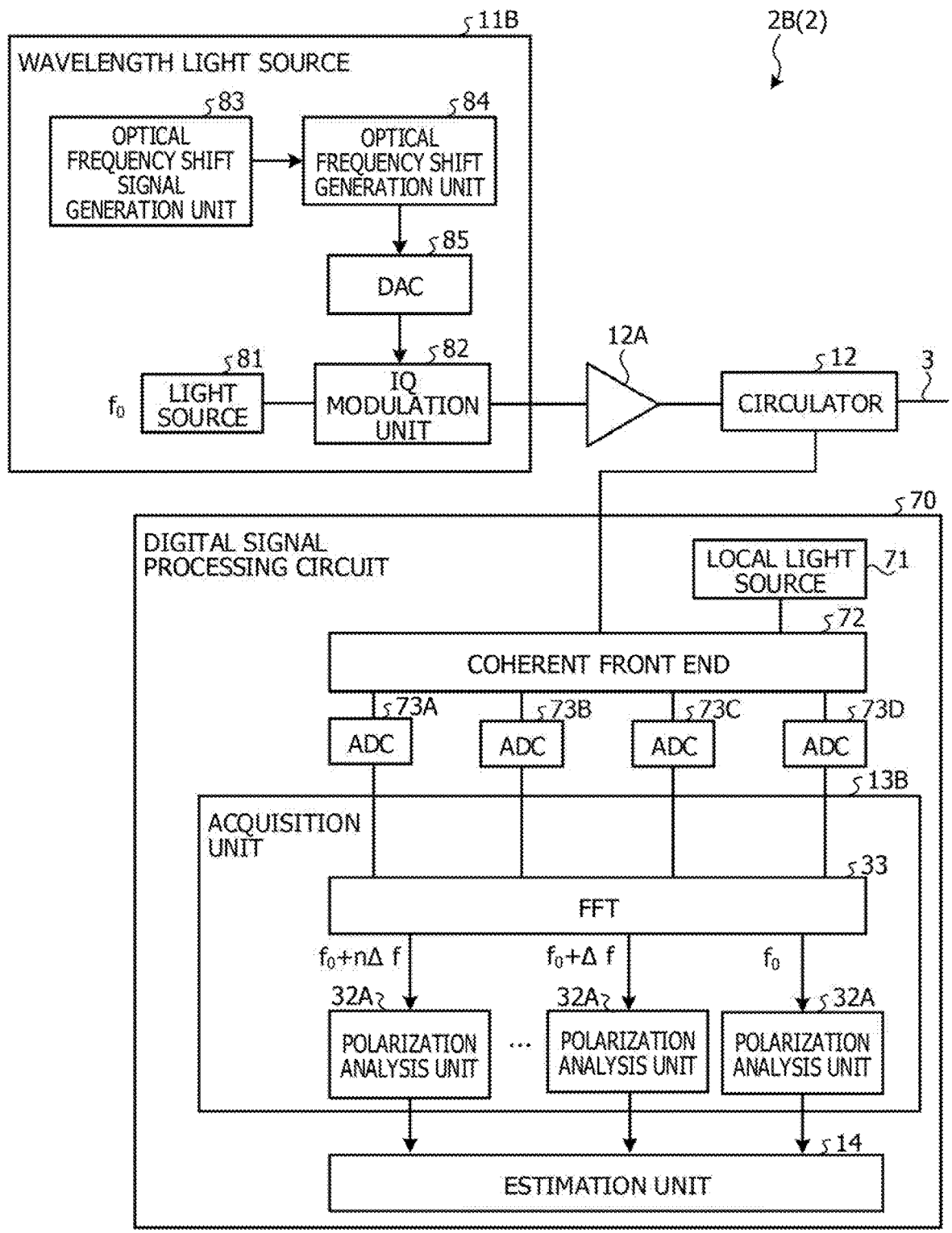
FIG. 21 is a block diagram illustrating an alternative example of the optical transmission apparatus of Embodiment 3.

Further, there has been described a case where a signal light beam is output from the wavelength light source 11B to the circulator 12 in the optical transmission apparatus 28 of Embodiment 3. However, the present embodiment is not limited thereto, and a configuration illustrated in FIG. 21 may be employed. FIG. 21 is a block diagram illustrating an alternative example of the optical transmission apparatus 2B of Embodiment 3. In the optical transmission apparatus 28 illustrated in FIG. 21, an optical amplifier 12A, such as, for example, EDFA or SOA, may be disposed between the wavelength light source 11B and the circulator 12. The optical amplifier 12A optically amplifies a signal light beam from the wavelength light source 11B, and outputs the optically-amplified signal light beam to the circulator 12. As a result, reception sensitivity is improved.

Note that there has been described a case where the optical transmission apparatus 2B of this embodiment estimates a polarization fluctuation portion with high accuracy. However, based on a time-dependent polarization state and a distance-dependent polarization state for each frequency shift amount, the polarization fluctuation time width and the polarization fluctuation speed (angle) illustrated in FIGS. 13, 14A, and 14B may be estimated.

There has been described a case where the optical transmission apparatus 2A of Embodiment 1 acquires a distance-dependent polarization state based on each of reflected light beams having different wavelengths and estimates a polarization fluctuation portion based on the distance-dependent polarization state. However, the present embodiment is not limited thereto, and another embodiment will be described below as Embodiment 4.

Embodiment 4

Figure 22:
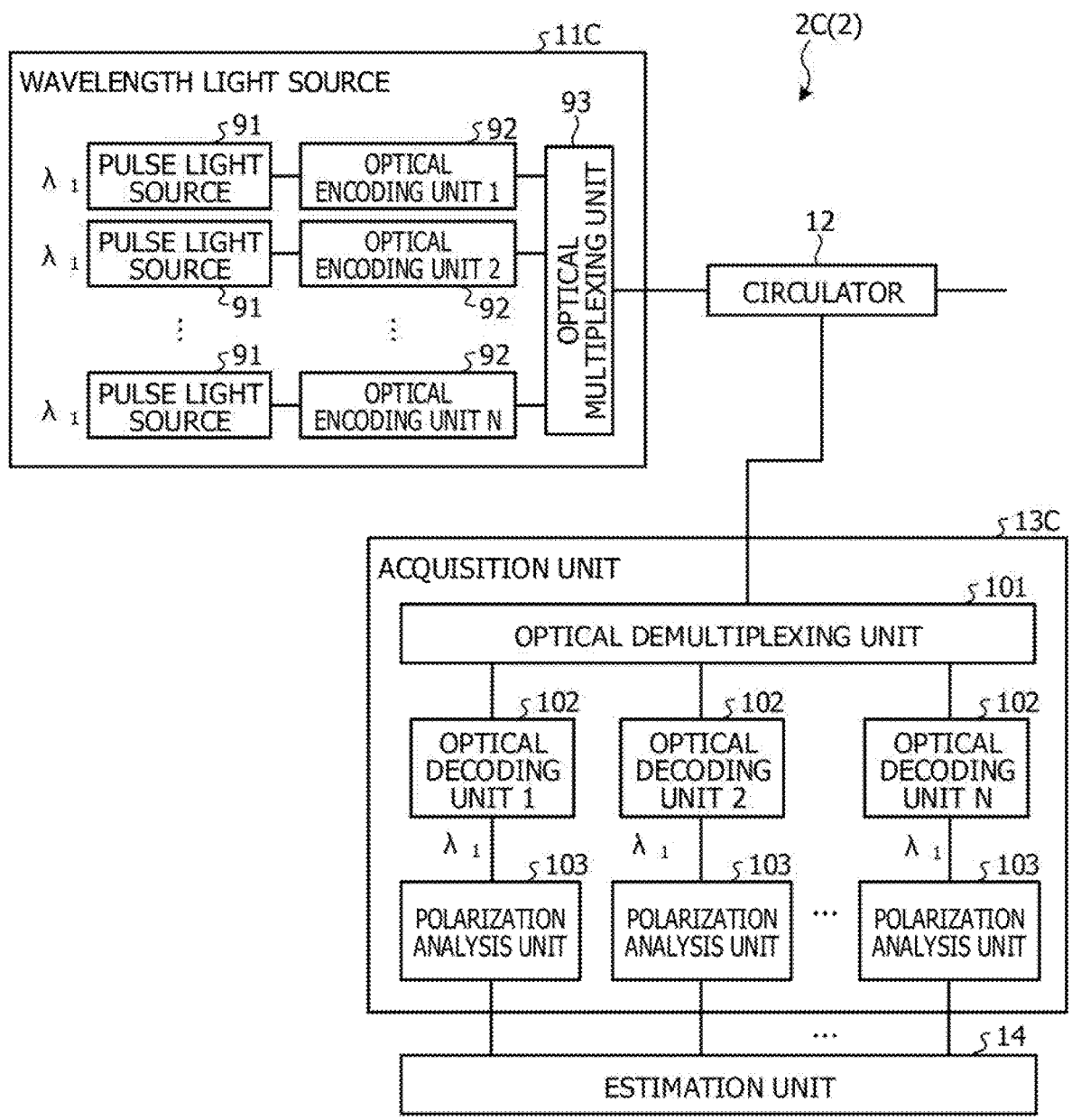
FIG. 22 is a block diagram illustrating an example of an optical transmission apparatus of Embodiment 4.

FIG. 22 is a block diagram illustrating an example of an optical transmission apparatus 2C of Embodiment 4. The optical transmission apparatus 2C illustrated in FIG. 22 is a transmission apparatus that employs an optical code multiplex division technique. A wavelength light source 11C in the optical transmission apparatus 2C includes a plurality of pulse light sources 91, a plurality of optical encoding units 92, and an optical multiplexing unit 93. The pulse light sources 91 generate signal light beams each having a single wavelength. The optical encoding units 92 encode the signal light beams from the pulse light sources 91 into signal light beams having different codes. The optical multiplexing unit 93 multiplexes the encoded signal light beams having the different codes, and sequentially outputs the multiplexed signal light beams to the circulator 12.

Figure 23:
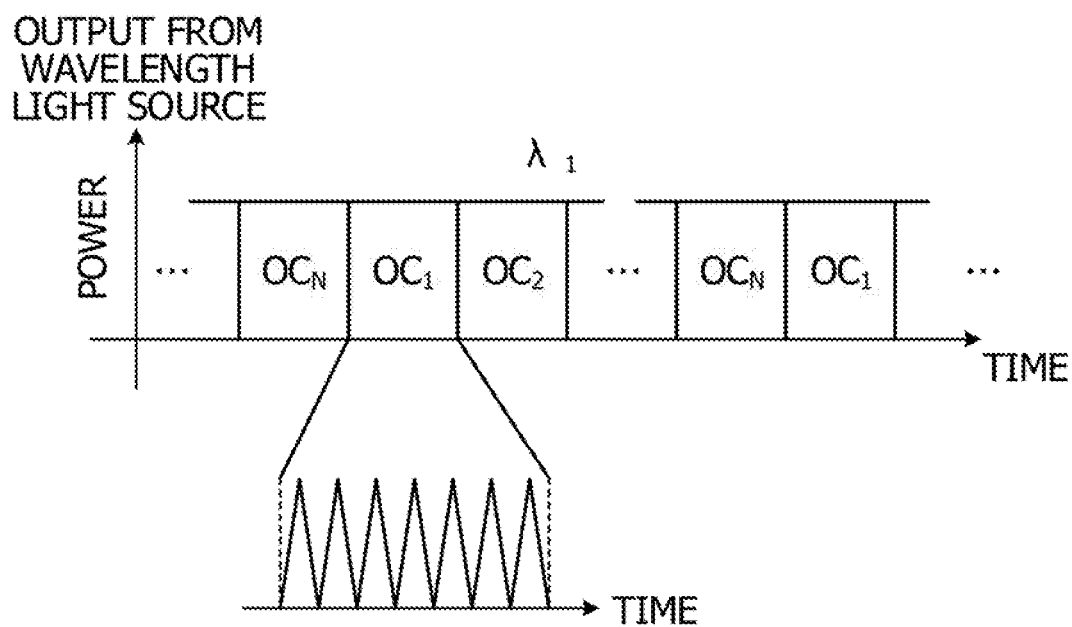
FIG. 23 is an explanatory diagram illustrating an example of an output timing of each signal light beam of a wavelength light source of Embodiment 4.

FIG. 23 is an explanatory diagram illustrating an example of an output timing of, each signal light beam of the wavelength light source 11C of Embodiment 4. The wavelength light source 11C can reduce the number of wavelengths of the wavelength light source 11C to be used by employing the optical code multiplex division technique. Optical codes 1 to N that are orthogonal to each other are prepared. Optical pulses output from the pulse light sources 91 are caused to pass through the respective optical encoding units 92, and are disposed in different time slots.

An acquisition unit 13C includes an optical demultiplexing unit 101, a plurality of optical decoding units 102, and a plurality of polarization analysis units 103. The optical demultiplexing unit 101 optically demultiplexes reflected light beams on the optical fiber 3 of the signal light beams from the circulator 12 to the respective optical decoding units 102. The optical decoding unit 102 is provided for each code of the optical encoding unit 92, and decodes a reflected light beam of a code allocated to the optical decoding unit 102 itself among the plurality of reflected light beams transmitted from the optical demultiplexing unit 101. The polarization analysis unit 103 is provided for each code of the optical encoding unit 92, receives the decoded reflected light beam from the optical decoding unit 102, and acquires a time-dependent polarization state from the reflected light beam. As to reception signals that have passed through the optical decoding units 102, an autocorrelation signal is obtained in a time slot in which an optical code (OC) 1 is disposed as the signal, and a high-intensity optical signal is obtained. Meanwhile, time slots in which other codes are disposed are cross-correlated, and only low-intensity signals that do not affect the autocorrelation signal are obtained.

Figure 24:
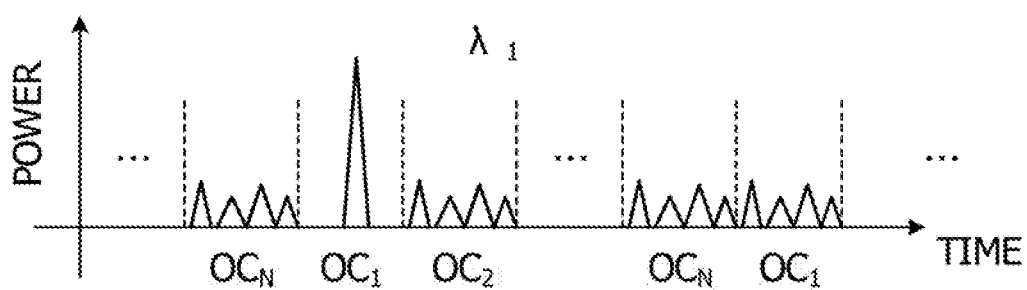
FIG. 24 is an explanatory diagram illustrating an example of processing for identifying a polarization fluctuation portion in Embodiment 4.

FIG. 24 is an explanatory diagram illustrating an example of processing for identifying a polarization fluctuation portion in Embodiment 4. The estimation unit 14 converts a time-dependent polarization state of each code into a distance-dependent polarization state, and estimates an occurrence portion of polarization fluctuation based on the converted distance-dependent polarization state.

Next, operation of the optical transmission apparatus 2C of Embodiment 4 will be described. The wavelength light source 11C in the optical transmission apparatus 2C sequentially outputs signal light beams having different codes to the optical fiber 3. The optical demultiplexing unit 101 in the acquisition unit 13C in the optical transmission apparatus 2C demultiplexes and outputs received light beams from the circulator 12 to the respective optical decoding units 102. Each optical decoding unit 102 decodes the received light beam with a code allocated to the optical decoding unit 102 itself, and, in a case where the received light can be decoded, outputs the decoded received light to the corresponding polarization analysis unit 103.

Each polarization analysis unit 103 acquires a time-dependent polarization state of the decoded received light (reflected light), and outputs the time-dependent polarization state of each code to the estimation unit 14. The estimation unit 14 converts the time-dependent polarization state into a distance-dependent polarization state for each code. Based on the distance-dependent polarization state of each code, the estimation unit 14 estimates a point detected at the closest distance as a polarization fluctuation portion.

The optical transmission apparatus 2C continuously inputs signal light beams having a plurality of different codes to the optical fiber 3, and converts a reflected light beam of each signal light beam into a time-dependent polarization state. The optical transmission apparatus 2C converts the time-dependent polarization state of each code into a distance-dependent polarization state, and estimates, as a polarization fluctuation portion, a point where the polarization state fluctuates, which is a point at the closest distance, based on the converted distance-dependent polarization state. As a result, even in a case where the optical code multiplex division technique is employed, it is possible to estimate a polarization fluctuation portion with high accuracy.

Note that there has been described a case where the optical transmission apparatus 2C of this embodiment estimates a polarization fluctuation portion with high accuracy. However, based on a time-dependent polarization state and a distance-dependent polarization state of each code, the polarization fluctuation time width and the polarization fluctuation speed (angle) illustrated in FIGS. 13, 14A, and 14B may be estimated. The present embodiment can be appropriately changed.

Further, each of the constituent elements of the units illustrated in the drawings does not always need to be physically configured as illustrated in the drawings. Specifically, for example, specific forms of separation and integration of the respective units are not limited to the illustrated forms, and all or some of the units may be functionally or physically separated and integrated in an arbitrary unit according to various loads, use situations, and the like.

Further, all or some of various processing functions executed in the respective devices may be executed by a central processing unit (CPU) (or a microcomputer such as a micro processing unit (MPU) or a micro controller unit (MCU)). Alternatively, all or some of the various processing functions may of course be executed by a program analyzed and executed by a CPU (or a microcomputer such as an MPU or an MCU) or hardware using wired logic.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmission apparatus, comprising:
a light source configured to output a plurality of light beams having different wavelengths to an optical fiber;
a receiver configured to receive, from the optical fiber, a plurality of reflected light beams, each of plurality of reflected light beams corresponding to each of the wavelengths of the plurality of light beams; and
a signal processing circuit configured to estimate a polarization fluctuation portion based on a plurality of polarization states, each of the plurality of polarization state corresponding to each of the plurality of received reflected light beams.

2. The optical transmission apparatus according to claim 1, wherein
the signal processing circuit estimates the polarization fluctuation portion based on a polarization state included in the plurality of polarization states in each unit time from a time at which the light beam is output to the optical fiber.

3. The optical transmission apparatus according to claim 2, wherein
the signal processing circuit converts the plurality of polarization states in each unit time into a fluctuation state in each unit section of the optical fiber, and estimates the polarization fluctuation portion based on the plurality of converted polarization states in each unit section.

4. The optical transmission apparatus according to claim 3, wherein
the signal processing circuit estimates a section closest to the optical transmission apparatus as the polarization fluctuation portion among a plurality of sections in which a fluctuation amount of polarization of a reflected light beam included in the plurality of reflected light beams is equal to or greater than a predetermined value.

5. The optical transmission apparatus according to claim 3, wherein
the signal processing circuit acquires a difference between the polarization state in each unit section of a reflected light beam include in the plurality of the reflected light beams corresponding to each of the plurality of wavelengths output from the light source at a first time and the polarization state in each unit section of a reflected light beam include in the plurality of the reflected light beams corresponding to each of the plurality of wavelengths output from the light source at a second time before the first time, and estimates a polarization fluctuation speed and a polarization fluctuation angle at which the polarization state fluctuates based on the difference.

6. The optical transmission apparatus according to claim 3, wherein
the signal processing circuit
converts the polarization state in each unit section into a frequency spectrum shape, and
determines whether or not the polarization state fluctuates based on the frequency spectrum shape in each unit section, and estimates a section in which the polarization state fluctuates as the polarization fluctuation portion.

7. The optical transmission apparatus according to claim 1, wherein
the light source includes
a plurality of first light sources configured to output light beams having different wavelengths, and
a plurality of modulation circuits configured to modulate each of the light beams having the plurality of wavelengths, respectively, in response to drive signals.

8. The optical transmission apparatus according to claim 1, wherein:
the light source includes
a single light source configured to generate a light beam having a single wavelength, and
a modulation circuit configured to generate a plurality of signal light beams having different frequency shift amounts from the light beam output from the single light source; and
the signal processing circuit acquires a polarization state included in the plurality of polarization states per unit time from reflected light beams of the respective signal light beams having different frequency shift amounts.

9. An optical transmission apparatus, comprising:
a plurality of single light sources, each of which is configured to generate a light beam having a single wavelength;
an encoding circuit configured to encode a plurality of light beams from the single light sources into respective signal light beams having different codes, and output the signal light beams to an optical fiber;
a receiver configured to receive, from the optical fiber, a plurality of reflected light beams, each of plurality of reflected light beams corresponding to each of the signal light beams having plurality of codes; and
a signal processing circuit configured to estimate a polarization fluctuation portion based on a plurality of polarization states, each of the plurality of polarization state corresponding to each of the plurality of received reflected light beams.

10. The optical transmission apparatus according to claim 9, wherein
the signal processing circuit estimates the polarization fluctuation portion based on a polarization state included in the plurality of polarization states in each unit time from a time at which the light beam is output to the optical fiber.

11. The optical transmission apparatus according to claim 10, wherein
the signal processing circuit converts the plurality of polarization state in each unit time into a fluctuation state in each unit section of the optical fiber, and estimates the polarization fluctuation portion based on the plurality of converted polarization state of the reflected light beam corresponding to each of the plurality of codes in each unit section.

12. An estimation method, comprising:
outputting a plurality of light beams having different wavelengths to an optical fiber;
receiving, from the optical fiber, a plurality of reflected light beams, each of plurality of reflected light beams corresponding to each of the wavelengths of the plurality of light beams; and
estimating a polarization fluctuation portion based on a plurality of polarization states, each of the plurality of polarization state corresponding to each of the plurality of received reflected light beams corresponding to each of the plurality of wavelengths.

13. The estimation method according to claim 12, wherein the estimating includes estimating the polarization fluctuation portion based on a polarization state included in the plurality of polarization states in each unit time from a time at which the light beam is output to the optical fiber.

14. The estimation method according to claim 13, wherein the estimating includes converting the plurality of polarization states in each unit time into a fluctuation state in each unit section of the optical fiber, and estimating the polarization fluctuation portion based on the plurality of converted polarization states in each unit section.

\* \* \* \* \*